United States Patent [19]

Kikuchi et al.

[11] Patent Number: 5,003,339
[45] Date of Patent: Mar. 26, 1991

[54] IMAGE SENSING APPARATUS HAVING AUTOMATIC FOCUSING FUNCTION FOR AUTOMATICALLY MATCHING FOCUS IN RESPONSE TO VIDEO SIGNAL

[75] Inventors: Kenichi Kikuchi, Osaka; Masao Takuma, Toyonaka; Toshinobu Haruki, Shijonawate, all of Japan

[73] Assignee: Sanyo Electric Co., Ltd., Osaka, Japan

[21] Appl. No.: 481,745

[22] Filed: Feb. 14, 1990

Related U.S. Application Data

[63] Continuation of Ser. No. 348,381, May 5, 1989, abandoned.

[30] Foreign Application Priority Data

May 11, 1988 [JP] Japan ............................. 63-113825
Jun. 10, 1988 [JP] Japan ............................. 63-144031

[51] Int. Cl.⁵ .......................................... G03B 13/36
[52] U.S. Cl. .................................. 354/402; 358/227
[58] Field of Search ................. 354/400, 402; 358/227

[56] References Cited

U.S. PATENT DOCUMENTS

| | | | |
|---|---|---|---|
| 4,591,919 | 5/1986 | Kaneda et al. | 358/227 |
| 4,614,975 | 9/1986 | Kaite | 358/227 |
| 4,762,986 | 8/1988 | Suda et al. | 358/227 |
| 4,804,831 | 2/1989 | Baba et al. | 358/227 |

FOREIGN PATENT DOCUMENTS

| | | |
|---|---|---|
| 183877 | 9/1985 | Japan . |
| 110369 | 5/1987 | Japan . |
| 182704 | 8/1987 | Japan . |
| 17418 | 1/1988 | Japan . |

Primary Examiner—Russell E. Adams
Attorney, Agent, or Firm—Peter L. Michaelson

[57] ABSTRACT

In a video camera having an automatic focusing function, a first sampling area in the center of an image sensed picture and a second sampling area around the first sampling area are set. Considering a case in which an auto-focus operation is carried out selecting the first sampling area as a focusing area, when the difference between the newest focus evaluating value and the maximum focus evaluating value becomes one-eighth or more of the maximum focus evaluating value, the second sampling area is selected as the focusing area, to carry out an auto-focus operation. Consequently, an auto-focus operation conforming to the state of an object is carried out. In addition, a priority area for exposure control is selected following selection of the focusing area. Thus, exposure relative to a main object is always maintained most suitably. Furthermore, even if the focus evaluating value has no distinct peak, the erroneous detection of the in-focus position can be prevented since the sampling area having a larger maximum value per unit area is selected as a focusing area.

16 Claims, 20 Drawing Sheets

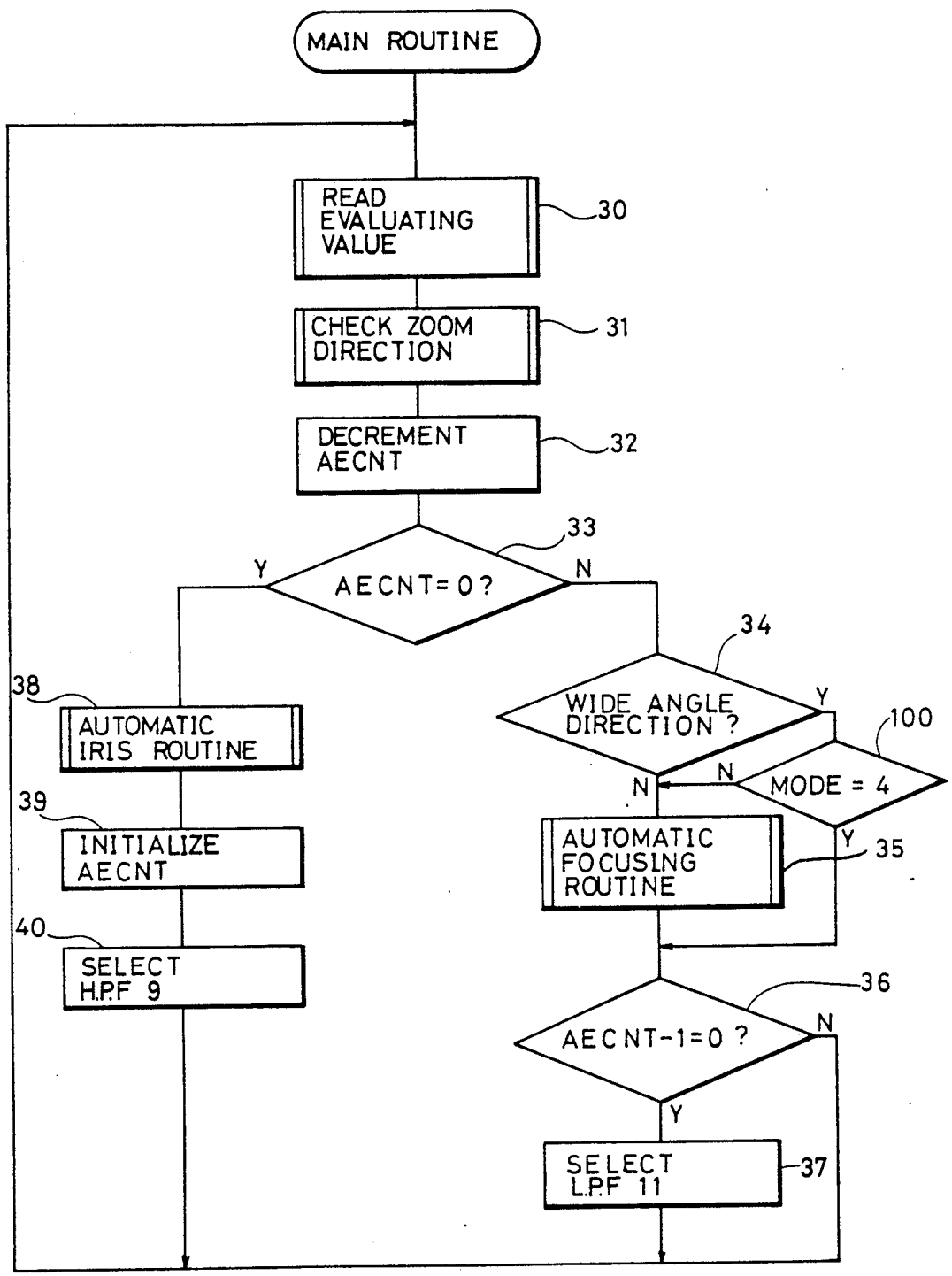

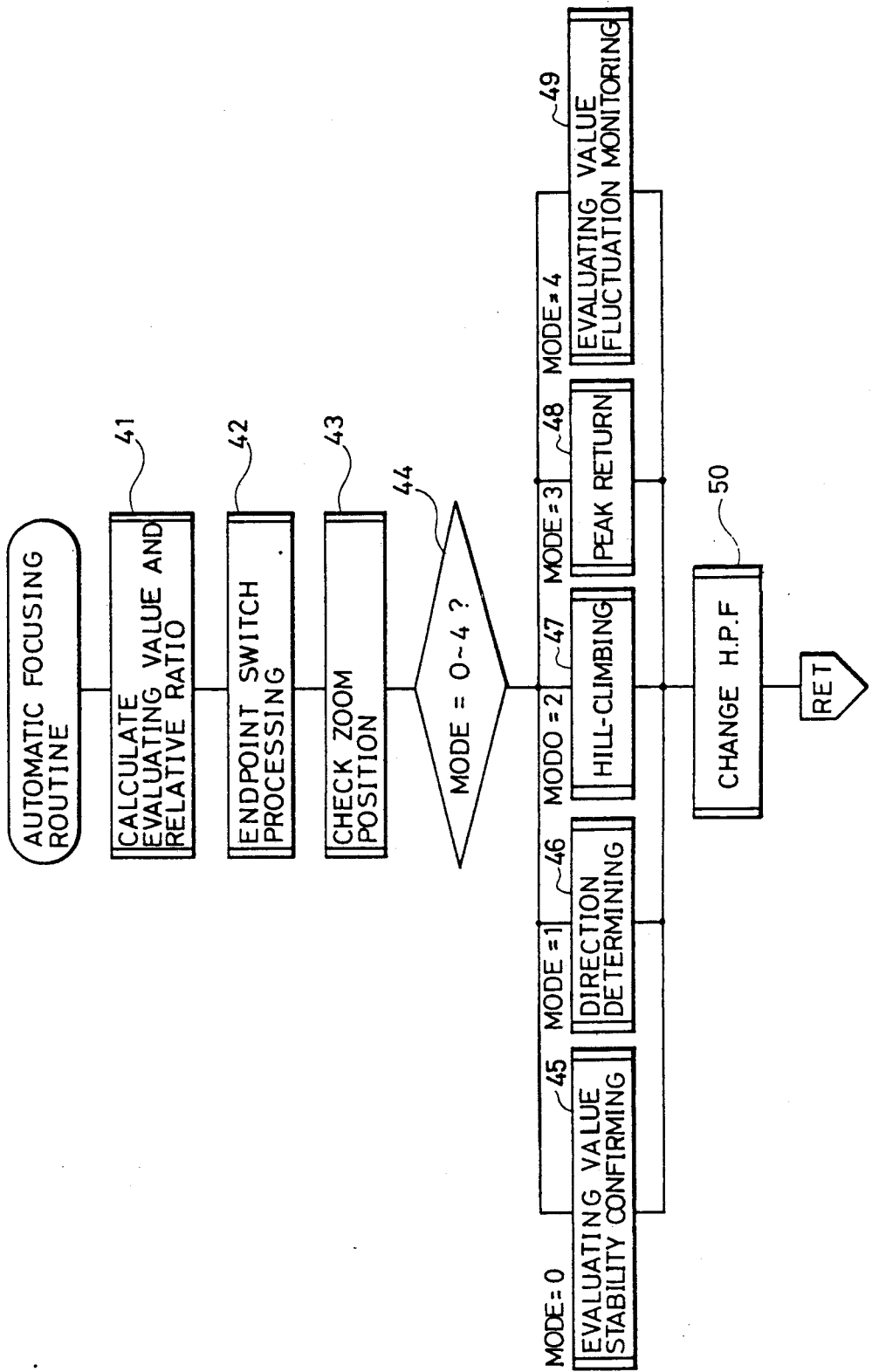

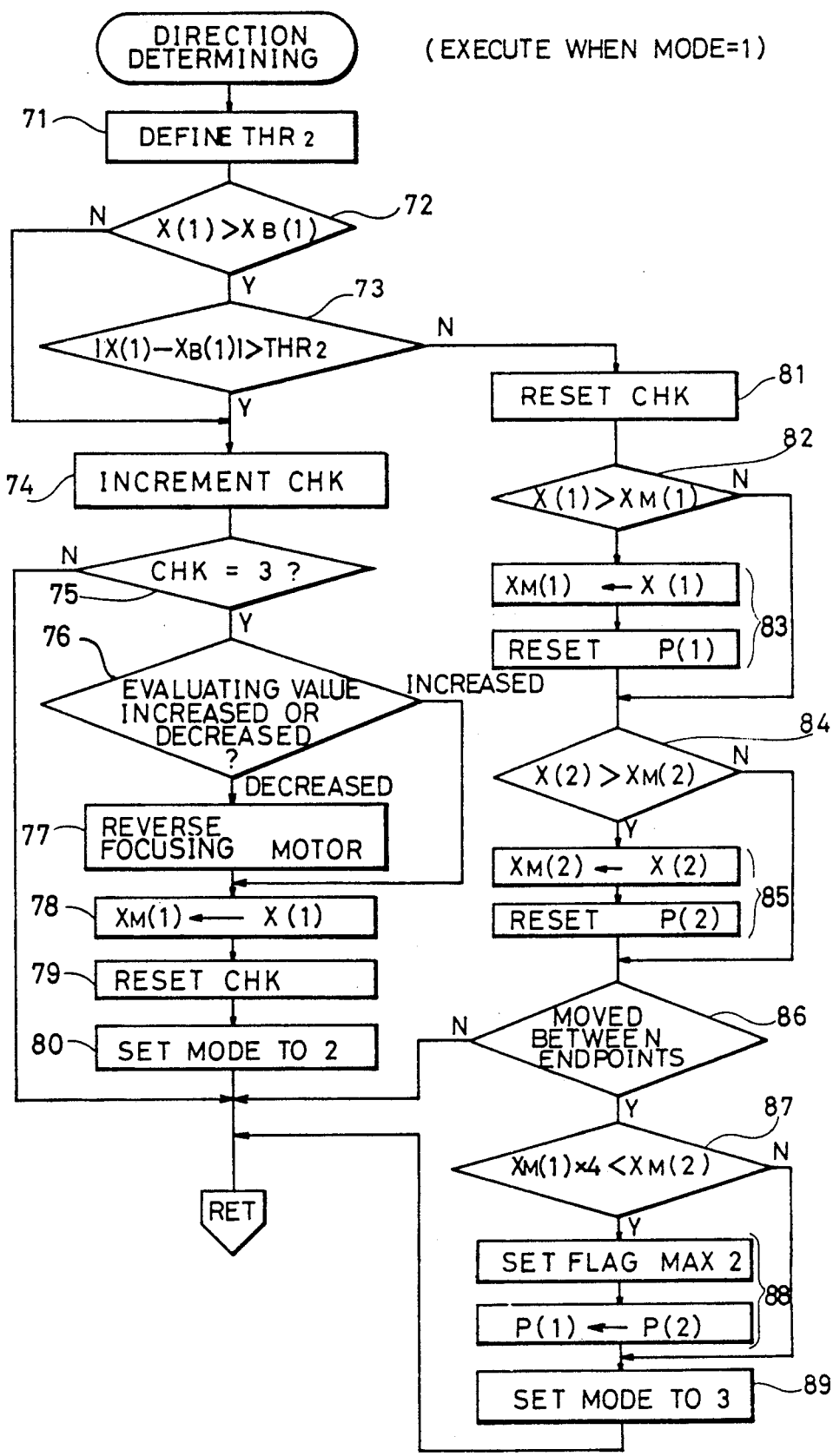

IMAGE SENSING APPARATUS HAVING AUTOMATIC FOCUSING FUNCTION FOR AUTOMATICALLY MATCHING FOCUS IN RESPONSE TO VIDEO SIGNAL

CROSS REFERENCE TO RELATED APPLICATION

This application is a continuation of copending patent application Ser. No. 07/348,381, filed on May 5, 1989, now abandoned.

BACKGROUND OF THE INVENTION

1. Field of the Invention

The present invention relates generally to an image sensing apparatus, and more particularly, to an image sensing apparatus such as a video camera having an automatic focusing function for automatically matching the focus relative to an object in response to a video signal obtained from an image sensor.

2. Description of the Background Art

Conventionally, in an automatic focusing apparatus used in an image sensing apparatus such as a video camera, an approach utilizing a video signal itself obtained from an image sensor for evaluating a state in which the focus is controlled has been developed. More specifically, in such an approach, a video signal obtained from an image sensor such as a CCD (charge coupled device) is passed through a high-pass filter (HPF) or a band-pass filter (BPF), to detect a high frequency component thereof as a focus evaluating value every constant time period, for example, every one field, and control a relative position of a lens and the image sensor such that the focus evaluating value reaches a peak. In this approach, an area for detecting the focus evaluating value in an image sensed picture, i.e, a focusing area is generally fixed as an area of constant size in the center of a picture.

Meanwhile, considering a case in which this focusing area is set large, if images of objects at different distances from a lens included in one picture are sensed or the background of the object has a high contrast, that is, has a large high frequency component, it is not determined which object is brought into focus. Thus, an object of interest to a user is not always brought into focus.

In order to prevent such a situation, it is considered that the focusing area is set small to bring only an object in the center of the picture into focus. However, the object frequently moves outside of the focusing area due to unintentional movement of the hands of the user and slight movement of the object, which is liable to cause a malfunction of automatic focusing.

As described in the foregoing, large and small focusing areas have both advantages and disadvantages, respectively. As means for eliminating the disadvantages, a technique has been proposed of providing large and small focusing areas and setting a prescribed level of a focus evaluating value in each of the areas. More specifically, according to such a technique, even if an object moves outside of the small focusing area so that the focus evaluating value in this area attains the prescribed level or less, an auto-focus operation is carried out based on the focus evaluating value in the large focusing area provided that the focus evaluating value in the large focusing area is at the prescribed level or more. Thus, a technique of switching focusing areas is disclosed in, for example, Japanese Patent Laying-Open Nos. 17418/1988, 182704/1987 and 183877/1985. More specifically, according to an in-focus state detecting apparatus disclosed in Japanese Patent Laying-Open No. 17418/1988, a large focusing area is selected after determining that the focus can not be detected in a small focusing area and then, detection of the focus is repeated in the large focusing area. In addition, according to an automatic focusing apparatus disclosed in Japanese Patent Laying-Open No. 182704/1987, a focusing area is enlarged in order to increase a focus evaluating value at the time of a low contrast to stabilize an automatic focusing operation. Furthermore, according to a focus detecting apparatus disclosed in Japanese Patent Laying-Open No. 183877/1985, focusing areas are switched depending on the focal length of an image sensing optical system.

According to the above described conventional techniques, the prescribed level of the focus evaluating value in each of the large and small focusing areas is a fixed value previously set. Therefore, a relative ratio of a peak value (a value in an in-focus state) of the focus evaluating value to the prescribed level which is the fixed value varies depending on the object. As a result, in the case of a high-contrast object, unless the object is considerably spaced apart from the small focusing area, the focus evaluating value does not attain the prescribed level or less so that the large focusing area is not selected. On the other hand, in the case of a low-contrast object, if the object moves slightly outside of the small focusing area, the large focusing area is immediately selected, so that there occurs a difference between movement of the object and timing of switching focusing areas depending on the object.

Additionally, if and when the background of the object has a high contrast, the focus evaluating value is large even in a significantly defocused state. If the focus evaluating value is beyond the prescribed level in the small focusing area, a malfunction occurs. More specifically, even if the object completely moves outside of the small focusing area, the large focusing area is not selected. In addition, if the object moves outside of the large focusing area, a new peak detecting operation is not carried out.

On the other hand, in the conventional automatic focusing apparatus, a focus evaluating value may have no distinct peak during the auto-focus operation. In such a case, a position where a focus evaluating value in a fixed focusing area is slightly projected is considered as an in-focus position, a lens being fixed therein. Thus, in the conventional automatic focusing apparatus, the peak of the focus evaluating value due to noises or the like may be erroneously judged to be the in-focus position, so that a malfunction of automatic focusing is liable to occur.

On the other hand, in an image sensing apparatus such as a video camera, control of a level of a video signal obtained from an image sensor, i.e., exposure control by, for example, adjusting a diaphragm and adjusting the amplification gain, together with the above described focus control, is a very important subject. Conventionally, a video camera has been put into practice which has a function of automatically matching exposure, i.e., an automatic iris function by adjusting an optical diaphragm and the amplification factor of an amplifier for amplifying a level of a video signal obtained from an image sensor based on the average of luminance levels of the video signal and a level of a peak value.

However, such a conventional automatic iris system has disadvantages. For example, if a high luminance portion such as a light source exists in a picture, the diaphragm is driven in the closing direction so that the gain of the entire picture is decreased, whereby a main object is insufficiently bright. On the other hand, if the background is very dark, the diaphragm is driven in the opening direction so that the gain of the entire picture is increased, whereby the main object becomes too bright.

A method of eliminating the disadvantages is disclosed in, for example, Japanese Patent Laying-Open No. 110369/1987. According to such a technique, an optical stop-down mechanism is driven to control the amount of light incident on an image sensor such that a luminance level of the entire image sensed picture coincides with a reference level, and a luminance level in a central area of a picture is weighted, as compared with a luminance level in a peripheral area thereof to control the amplification gain of a video signal considering the central area as a priority area, thereby to decrease the effect of an abnormal luminance portion such as a light source which exists in the peripheral area on exposure control.

Meanwhile, if and when the above described automatic focusing apparatus and exposure control apparatus are equipped with one video camera, the same area can be set as a focusing area where an object exists and a priority area where an object exists. However, considering a case in which large and small focusing areas are provided and switched as described above, when the priority area is fixed in, for example, the smaller focusing area and the object laterally moves to be outside of the small focusing area, the larger focusing area is selected so that an in-focus operation is most suitably carried out. However, as for exposure control, only exposure in the smaller focusing area where no object exists becomes most suitable. As a result, overexposure or underexposure is liable to be obtained with respect to the object which moves outside of the smaller focusing area.

SUMMARY OF THE INVENTION

Accordingly, an object of the present invention is to provide an image sensing apparatus capable of preventing a malfunction of automatic focusing by switching focusing areas according to an object.

Another object of the present invention is to provide an image sensing apparatus in which the possibility of carrying out an automatic focusing operation by erroneously judging a peak of a focus evaluating value due to noises or the like to be an in-focus state can be decreased.

Still another object of the present invention is to provide an image sensing apparatus capable of always obtaining exposure most suitable for an object by taking an area which is a destination of an object to be moved as a priority area for exposure control.

Briefly stated, the present invention is directed to an image sensing apparatus for automatically matching the focus relative to an object, which comprises an image sensing circuit having a focusing lens and an image sensor for generating a video signal in response to light incident from the object, a relative position changing apparatus for changing a relative position in the direction of an optical axis of a focusing lens with respect to the image sensor, a sampling area setting circuit for setting a first sampling area located in the center of an image sensed picture and a second sampling area including the first sampling area and having a larger area than the first sampling area by time division of the video signal, a focus evaluating value detecting circuit for detecting every constant time period a level of a high frequency component in a video signal in each of the first and second sampling areas to supply the same as a focus evaluating value in the corresponding sampling area, a circuit for selecting either one of the first and second sampling areas as a focusing area according to a relative relation between the newest value of the focus evaluating value in each of the first and second sampling areas and a variable reference value calculated based on the previous focus evaluating value in the corresponding sampling area, and a control circuit for controlling the relative position changing apparatus based on a focus evaluating value corresponding to the sampling area selected as the focusing area such that a relative position of the focusing lens is driven to a position where the focus evaluating value takes the maximum value.

In accordance with another aspect of the present invention, an image sensing apparatus for automatically matching the focus relative to an object comprises an image sensing circuit having a focusing lens and an image sensor for generating a video signal in response to light incident from the object, a relative position changing apparatus for changing a relative position in the direction of an optical axis of the focusing lens with respect to the image sensor, a sampling area setting circuit for setting a first sampling area located in the center of an image sensed picture and a second sampling area including the first sampling area and having a larger area than that of the first sampling area by time division of the video signal, a focus evaluating value detecting circuit for detecting every constant time period a level of a high frequency component in a video signal in each of the first and second sampling areas to supply the same as a focus evaluating value in the corresponding sampling area, a circuit for selecting either one of the first and second sampling areas as a focusing area, a first control circuit for controlling the relative position changing apparatus based on the focus evaluating value corresponding to the sampling area selected as the focusing area such that the relative position of the focusing lens is driven to a position where the focus evaluating value takes a maximal value having a predetermined projected amount as compared with focus evaluating values in relative positions of focusing lens before and after the position of the focusing lens, and a second control circuit for controlling the relative position changing apparatus such that the respective maximum values of the focus evaluating values in the first and second sampling areas are compared with each other per unit area when the focus evaluating value corresponding to the selected sampling area does not take the maximal value, so that the relative position of the focusing lens is fixed to a position where the focus evaluating value in the sampling area having a larger maximum value reaches a maximum.

In accordance with still another aspect of the present invention, an image sensing apparatus for automatically matching the focus and exposure relative to an object comprises an image sensing circuit having a focusing lens and an image sensor for generating a video signal in response to light incident from the object, a relative position changing apparatus for changing a relative position in the direction of an optical axis of the focusing lens with respect to the image sensor, an apparatus for changing the exposure relative to the object, a circuit for setting a plurality of divided sampling areas on an image sensed picture by time division of the video signal, a focus evaluating value detecting circuit for detecting every constant time period a level of a high frequency component in a video signal in each of the plurality of sampling areas to supply the same as a focus evaluating value in the corresponding sampling area, an exposure evaluating value detecting circuit for detecting every constant time period a level of a luminance signal in the video signal in each of the plurality of sampling areas to supply the same as an exposure evaluating value in the corresponding sampling area, a first selecting circuit for selecting any one of the plurality of sampling areas as a focusing area, a first control circuit for controlling the relative position changing apparatus based on a focus evaluating value corresponding to the sampling area selected as the focusing area such that the relative position of the focusing lens is driven to a position where the focus evaluating value reaches a maximum, a second selecting circuit for selecting the sampling area selected by the first selecting circuit as a priority area for exposure control, and a second control circuit for controlling the exposure changing apparatus such that an exposure evaluating value corresponding to the sampling area selected as the priority area coincides with a predetermined target level.

A principal advantage of the present invention is that since not a fixed value but a variable value set based on a focus evaluating value in each area is used as a prescribed level for switching focusing areas, a focusing area corresponding to an object can be selected, so that a malfunction of automatic focusing can be prevented.

Another advantage of the present invention is that even if a focus evaluating value has no distinct peak, an auto-focus operation is carried out considering as a focusing area a sampling area having the larger maximum focus evaluating value, so that erroneous detection of an in-focus position caused by noises or the like can be prevented.

Still another advantage of the present invention is that a priority area for exposure control is switched which follows switching of focusing areas, so that exposure most suitable for an object can be obtained without being affected by an area where no object exists.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a flowchart showing a main routine of the automatic focusing/automatic iris operation;

FIG. 4 is a flowchart showing a routine of the automatic focusing operation;

FIG. 8 is a flowchart showing a direction determining routine;

DESCRIPTION OF THE PREFERRED EMBODIMENTS

Figure 1:
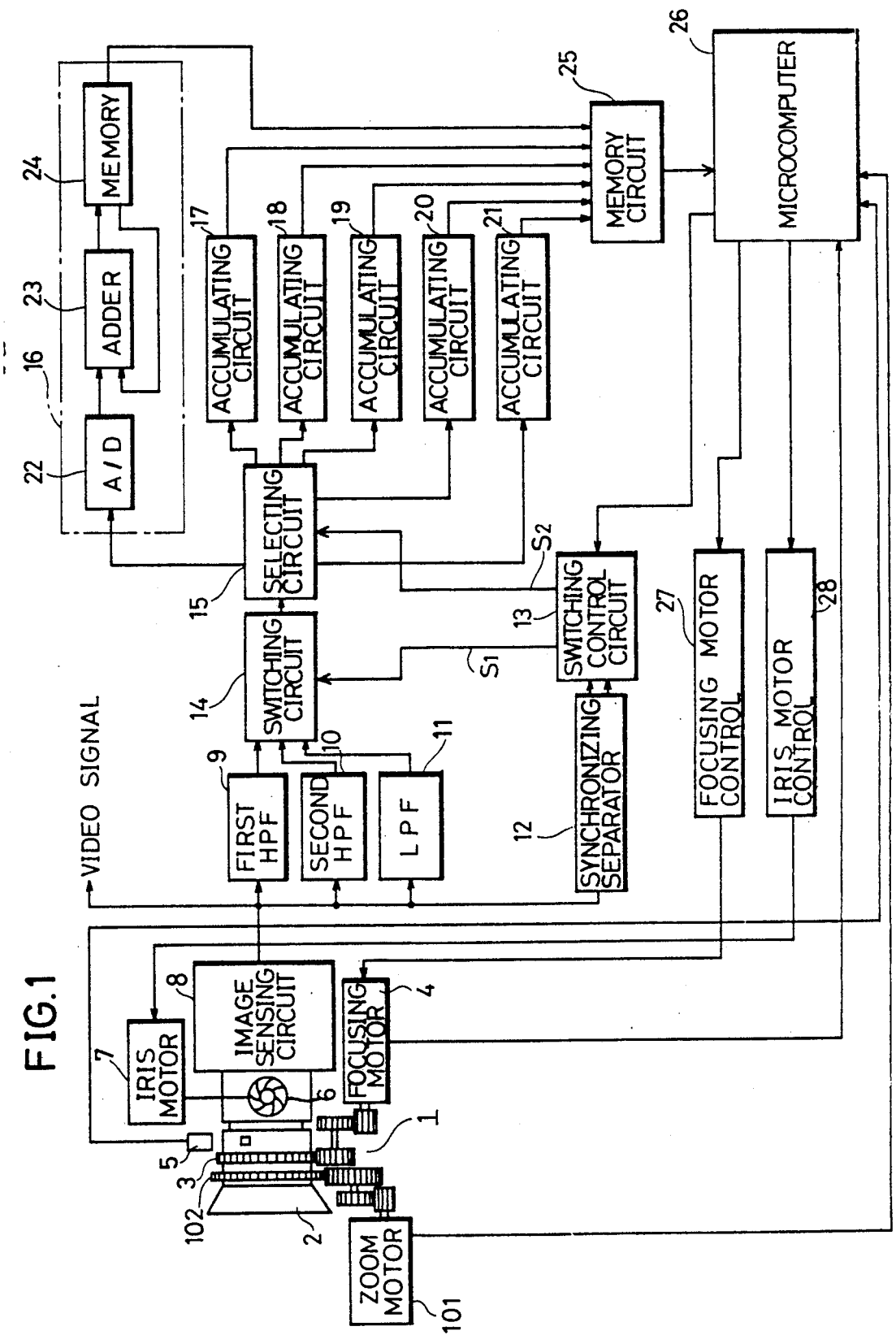
FIG. 1 is a schematic block diagram showing an automatic focusing/automatic iris apparatus according to an embodiment of the present invention.

FIG. 1 is a schematic block diagram showing an automatic focusing/automatic iris apparatus according to an embodiment of the present invention. In FIG. 1, a video camera portion 1 comprises a focusing lens 2, a focusing ring 3 for supporting this focusing lens 2 and moving the same in the direction of an optical axis, a focusing motor 4 for driving this focusing ring 3, an endpoint switch 5 for detecting the limit of a range in which the focusing ring 3 can be driven, a stop-down mechanism 6 for controlling exposure, an iris motor 7 for driving this stop-down mechanism 6, and an image sensing circuit 8 having a solid-state image sensor for converting light incident from an object into a video signal.

A luminance signal in the video signal obtained from the image sensing circuit 8 is applied to a first high-pass filter (HPF) 9 and a second HPF 10 having different cut-off frequencies, a low-pass filter (LPF) 11, and a synchronizing separator circuit 12.

Figure 2:
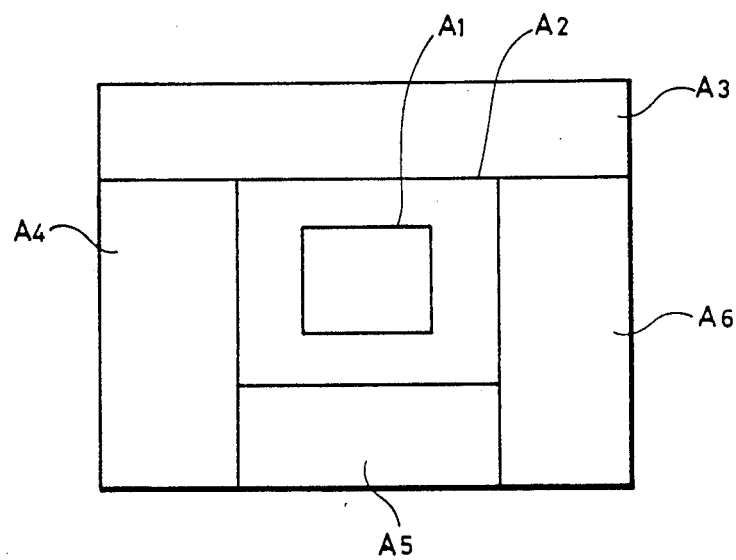
FIG. 2 is a diagram typically showing a manner in which sampling areas are set on an image sensed picture.

A vertical synchronizing signal VD and a horizontal synchronizing signal HD separated from the luminance signal by the synchronizing separator circuit 12 are supplied to a switching control circuit 13 for setting a sampling area. This switching control circuit 13 is responsive to the vertical and horizontal synchronizing signals VD and HD and a fixed output of an oscillator (not shown) serving as a clock for driving a CCD for outputting a selection signal S2 to apply the same to a selecting circuit 15 in the succeeding stage so as to set a rectangular first sampling area A1 in the center of a picture, a second sampling area A2 including this area A1 and having an area which is four times that of the area A1, and third to sixth sampling areas A3, A4, A5 and A6 around this area A2, as shown in FIG. 2. In addition, the switching control circuit 13 outputs a switching signal S1 for alternately selecting for each field outputs of the first HPF 9 and the second HPF 10 and selecting an output of the LPF 11 once per 32 fields to apply the same to a switching circuit 14.

As a result, the switching circuit 14 alternately selects the outputs of the first HPF 9 and the second HPF 10 for each field to output the same to the selecting circuit 15 in the succeeding stage and further selects the output of the LPF 11 only once per 32 fields to apply the same to the selecting circuit 15, in response to the switching signal S1.

On the other hand, the selecting circuit 15 is responsive to the selection signal S2 from the switching control circuit 13 for selectively applying the output selected by the switching circuit 14 to accumulating circuits 16, 17, ..., 21 corresponding to sampling areas. More specifically, an output of each of the filters with respect to the first sampling area A1 and an output of each of the filters with respect to the second sampling area A2 are respectively applied to the accumulating circuits 16 and 17. Similarly, outputs of the respective filters with respect to the third to sixth sampling areas A3, A4, A5 and A6 are respectively applied to the accumulating circuits 18, 19, 20 and 21.

The accumulating circuit 16 comprises an A/D converter 22, an adder 23, and a memory circuit 24. The A/D converter 22 sequentially A/D converts the filter outputs passing through the selecting circuit 15, to apply the same to the adder 23. The adder 23, together with the A/D converter 22 in the preceding stage and the memory circuit 24 in the succeeding stage, constitutes a digital integrator, which adds an output of the memory circuit 24 to an output of the A/D converter 22 to supply the result of the addition to the memory circuit 24. The memory circuit 24 is reset for each field. Thus, the memory circuit 24 holds an output of the adder 23, i.e., a digitally converted value, corresponding to one field, of a level of a luminance signal passing through a filter selected in the current field with respect to the first sampling area A1.

The accumulating circuits 17, 18, ..., 21 have all the same structures as that of the accumulating circuit 16. Thus, a memory circuit contained in each of the accumulating circuits holds an integrated value, corresponding to one field, of a level of a luminance signal passing through a filter selected in the current field with respect to each of the sampling areas. The integrated value in each of the memory circuits is further applied to the memory circuit 25 in the succeeding stage, to be collectively stored therein.

Areas where passage through the first HPF 9, the second HPF 10 and the LPF 11 is allowed are respectively set to 600 KHz or more, 200 KHz or more and 2.4 MHz or less. In practice, the areas can be respectively set using BPFs respectively having pass bands of 600 KHz to 2.4 MHz, 200 KHz to 2.4 MHz, and 0 to 2.4 MHz. 2.4 MHz is a substantially high frequency independent of a luminance signal and thus, the LPF 11 can be omitted. Thus, a high frequency component or a low frequency component, corresponding to one field, of a luminance signal passing through any one of the first HPF 9, the second HPF 10 and the LPF 11 is digitally integrated, the integrated value being stored in a memory circuit 25 as an evaluating value in the current field for each sampling area. An integrated value of a low frequency component in a field where the LPF 11 is selected and an integrated value of a high frequency component in a field where the first HPF 9 or the second HPF 10 is selected out of the integrated values stored in the memory circuit 25 are respectively operated by a microcomputer 26 in the succeeding stage as an exposure evaluating value for exposure control and a focus evaluating value for focus control.

The evaluating values are processed by the microcomputer 26 in a software manner. Based on the result of this processing, the microcomputer 26 carries out an automatic focusing operation such that the focus evaluating value reaches a maximum by issuing a command to a focusing motor control circuit 27, thereby to drive the focusing motor 4 to move the focusing lens 2. In addition, the microcomputer 26 carries out automatic exposure control such that the exposure evaluating values becomes a predetermined value by also issuing a command to an iris motor control circuit 28, thereby to drive the iris motor 7 to operate the stop-down mechanism 6.

Referring now to a flowchart of FIG. 3, description is made of a main routine of an automatic focusing operation and an automatic iris (automatic exposure control) operation by the microcomputer 26.

When a video camera enters an operating state, the microcomputer 26 first executes a main routine shown in FIG. 3.

First, in the step 30, an integrated value corresponding to the current one field with respect to each sampling area is read in the microcomputer 26 from the memory circuit 25. Then, in the step 31, the rotational direction of a zoom motor 101 (see FIG. 1) is detected. In this case, the zoom motor 101 drives rotation of a zoom ring 102 rotatably arranged in a lens barrel portion projected forward from a main body of the video camera 1 in a radial direction. This zoom ring 102 supports a zoom lens (not shown) which is a variable power lens. This zoom lens moves in the direction of an optical axis according to rotation of the zoom ring 102, which is movable from a telescope (Tele) region to a wide angle (Wide) region through a middle region. In general, a user can obtain a desired zoom position by operating a zoom driving switch (not shown) arranged in the main body of the camera to a telescope direction or a wide angle direction to rotate the zoom motor 101 in either direction.

Then, a count value of a counter AECNT provided for performing an automatic focusing operation and an automatic iris operation in a time divisional manner is decremented, that is, one is subtracted therefrom (in the step 32), to determine whether or not the count value is zero (in the step 33). The automatic focusing operation is carried out if the count value is not zero, while the automatic iris operation is carried out only when the count value is zero. In addition, if and when it is confirmed in the step 34 that result of the detection of the rotational direction of the zoom motor 101 i.e., a zoom direction in the step 31 is a wide angle direction and it is further determined in the step 100 that a code indicating an operation mode for automatic focusing as described below is "4", that is, the usual automatic focusing operation has been already completed so that the focusing lens reaches once a peak of the focus evaluating value, an automatic focusing routine (in the step 35) for carrying out an automatic focusing basic operation is not executed, to be skipped. The reason is as follows: when a zoom mechanism moves toward a wide angle side, the depth of field gradually becomes larger. Thus, if an in-focus state is achieved once before a zooming operation, the automatic focusing operation need not be carried out again during the zooming operation in a wide angle direction. In addition, if the automatic focusing operation is carried out in such a case, an unnecessary automatic focusing operation is repeated due to fluctuations in the focus evaluating value caused by the change in the angle of field, resulting in an unclear picture. Thus, the unclear picture must be prevented. If and when the zoom direction is not the wide angle direction, or the zoom direction is the wide angle direction but the in-focus state is not achieved immediately before the zooming operation, the automatic focusing routine (in the step 35) is executed.

When the automatic focusing routine is terminated, it is determined whether or not the result obtained by subtracting one from the content of the counter AECNT is zero (in the step 36). If the count value is zero, a control signal is generated to the switching control circuit 13 from the microcomputer 26, and the switching control circuit 13 applies the switching signal S1 for selecting the output of the LPF 11 to the switching circuit 14 upon receipt of the control signal, so that the output of the LPF 11 is selected (in the step 37). Consequently, when the output of the LPF 11 is selected, the microcomputer 26 waits until an evaluating value obtained corresponding to this selected output of the LPF 11 is read in the memory circuit 25.

On the other hand, when the automatic iris operation is selected in the step 33, an automatic iris routine (in the step 38) which is the basis of the automatic iris operation is executed. Thereafter, the counter AECNT is returned to an initial state (in the step 39) and the output of the first HPF 9 is further selected (in the step 40), so that the microcomputer 26 waits for accumulation of evaluating values in the next field.

The initial state of the counter AECNT is a state in which an initial value "32" is set so as to calculate an exposure evaluating value in response to the luminance signal passing through the LPF 11 for one field every 32 fields.

Referring now to a flowchart of FIG. 4, description is made of the automatic focusing operation according to the present invention.

If the automatic focusing operation is selected in the step 33 in the main routine shown in FIG. 3 and the zoom mechanism is not moved to the wide angle side (in the step 34), the automatic focusing routine (in the step 35) is executed.

First, in the step 41 shown in FIG. 4, focus evaluating values and a relative ratio thereof are calculated based on integrated values corresponding to sampling areas stored in the memory circuit 25. Then, confirming processing of an endpoint switch of the focusing ring is performed in the step 42 and then, a zoom position which is a zoom region of a zoom mechanism is confirmed in the step 43. Thereafter, a so-called hill-climbing control is started.

The hill-climbing control comprises a total of five routines: an evaluating value stability confirming routine (in the step 45), direction determining routine (in the step 46), a hill-climbing routine (in the step 47), a peak return routine (in the step 48) and an evaluating value fluctuation monitoring routine (in the step 49). Selection among the routines is made by designating any one of operation mode codes 0 to 4 in the step 44 according to conditions set in the previous field. In general, the evaluating value stability confirming routine (in the step 45), the direction determining routine (in the step 46), the hill-climbing routine (in the step 47), the peak return routine (in the step 48) and the evaluating value fluctuation monitoring routine (in the step 49) are executed in that order.

After each of the routines is terminated, the outputs of the high-pass filters are switched in the step 50. More specifically, when the automatic focusing routine in the current field is executed in response to the output of the first HPF 9 by the switching circuit 14, the output of the second HPF 10 is selected before the next field. In the contrary case, the microcomputer 26 applies a control signal to the switching control circuit 13 so as to achieve switching from the output of the second HPF 10 to the output of the first HPF 9. Thus, while the automatic focusing routine 35 is selected in the steps 33 and 34 in the main routine, the outputs of the first HPF 9 and the second HPF 10 are alternately selected for each field.

Figure 5:
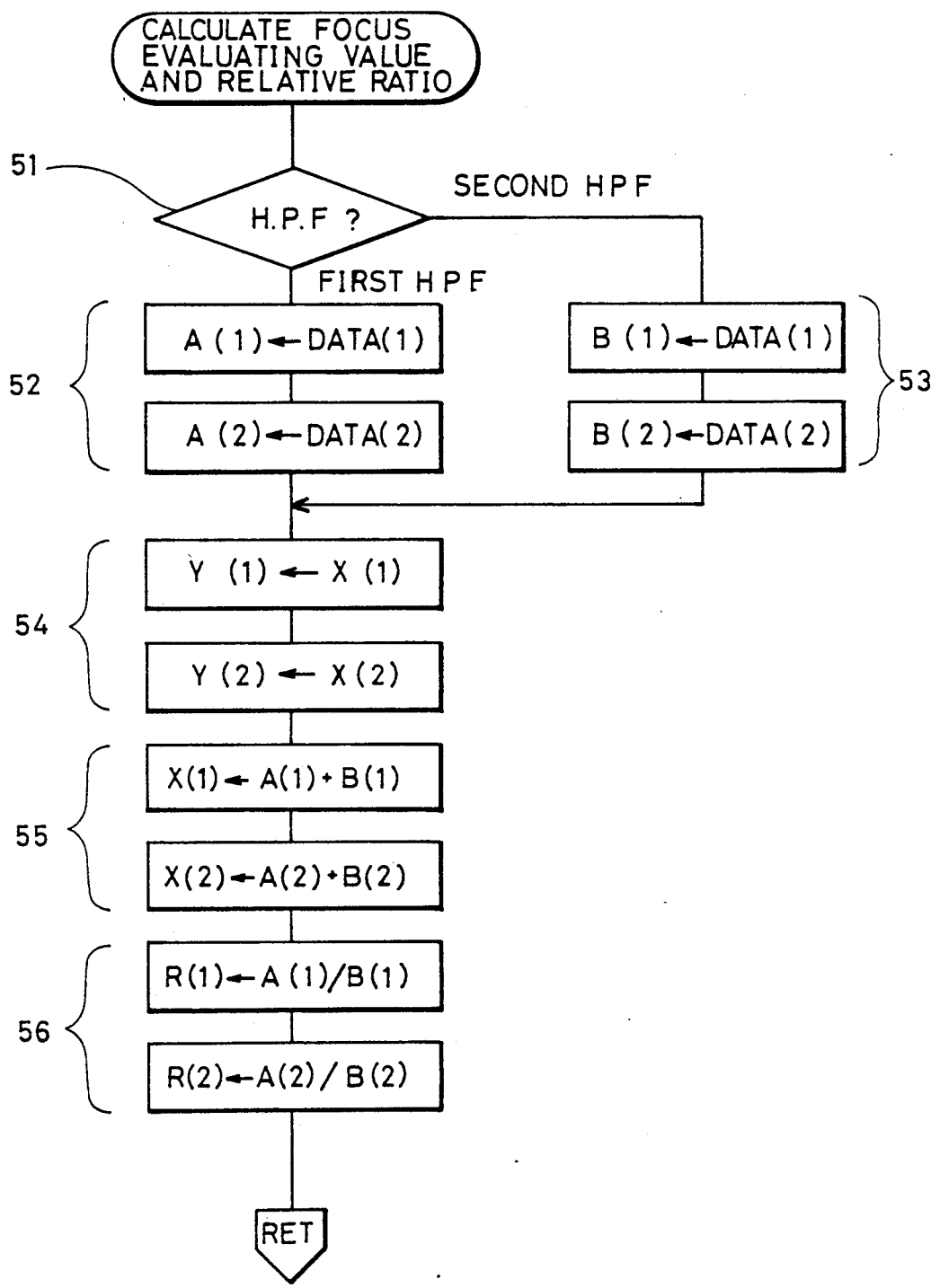
FIG. 5 is a flowchart showing a routine for calculating focus evaluating values and a relative ratio.

Operations carried out in the automatic focusing routine shown in FIG. 4 will be individually described. Referring to a flowchart of FIG. 5, description is made of a calculating operation of focus evaluating values and a relative ratio thereof in the step 41.

First, it is determined in the step 51 which of outputs of the first HPF 9 and the second HPF 10 is used for extracting integrated values integrated by the accumulating circuits 16 and 17, i.e., integrated values DATA (1) and DATA (2) in the first and second sampling areas A1 and A2 out of integrated values held in the memory circuit 25 in the current field. The DATA (1) and the DATA (2) are respectively substituted in memories A(1) and A(2) (in the step 52) if it is determined that the output of the first HPF 9 is used while being respectively substituted in memories B(1) and B(2) (in the step 53) if it is determined that the output of the second HPF 10 is used. However, as described above, the second sampling area A2 is a region having an area which is four times that of the first sampling area A1 and including the first sampling area A1.

Then, in the step 54, focus evaluating values in first and second sampling areas A1 and A2 in the previous field ar respectively transferred to memories Y(1) and Y(2).

In the step 55, focus evaluating values X(1) and X(2) in the first and second sampling areas A1 and A2 in the current field are calculated based on data in the memories A(1), A(2), B(1), and B(2). In this case, the focus evaluating value X(1) in the first sampling area A1 becomes the sum of values of the memories A(1) and A(2), i.e., the sum obtained by adding the newest accumulated value taken when the output of the first HPF 9 is used in the first sampling area A1 to the newest accumulated value taken when the output of the second HPF 10 is used. Similarly, the focus evaluating value X(2) becomes the sum of the values of the memories A(2) and B(2).

Figure 6:
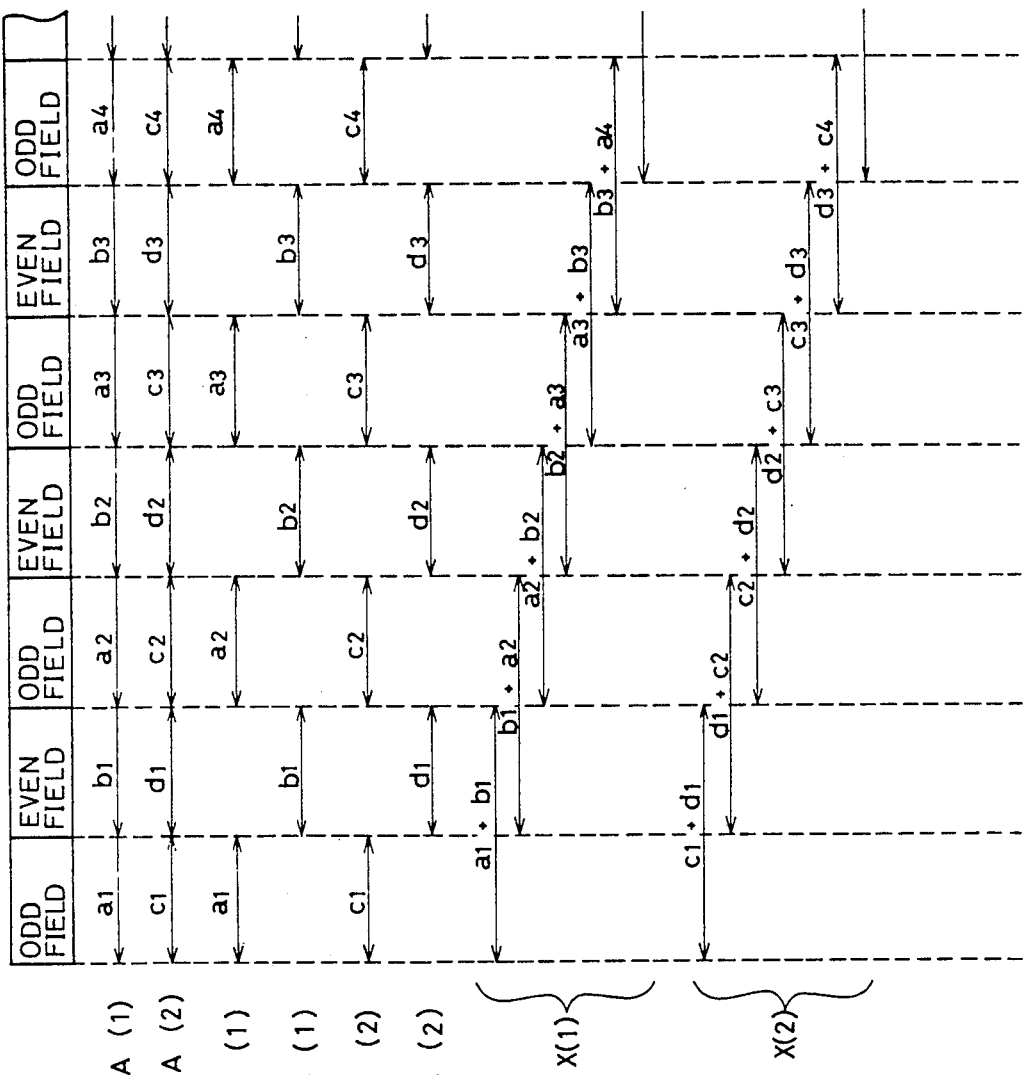
FIG. 6 is a diagram for typically explaining a manner in which the focus evaluating value and the relative ratio are calculated.

For example, as shown in FIG. 6, it is assumed that a1, b1, a2, b2, . . . are accepted in a memory for each field as the data DATA (1), and c1, d1, c2, d2, . . . are accepted in a memory as the data DATA (2), where a1, a2, a3, . . . are integrated values in the first sampling area A1 extracted using the output of the first HPF 9, b1, b2, b3, . . . are integrated values in the first sampling area A1 extracted using the output of the second HPF 10, c1, c2, c3, . . . are integrated values in the second sampling area A2 extracted using the output of the first HPF 9, and d1, d2, d3, . . . are integrated values in the second sampling area A2 extracted using the output of the second HPF 10. As a result, the focus evaluating value X(1) sequentially varies for each field such as a1+b1, b1+a2, a2+b2, b2+a3, . . . , and the focus evaluating value X(2) sequentially varies for each field such as c1+d1, d1+c2, c2+d2, d2+c3, . . . . Thus, the focus evaluating value in each sampling area becomes the sum of an integrated value extracted using the output of either one of the HPFs in the current field and an integrated value extracted using the output of the other HPF in the previous field, so that integrated values in an odd field and an even field are included in a single focus evaluating value. As a result, the variation in evaluating value for each field caused by interlacing or the like and the effect of noises on the evaluating values are mitigated, so that the automatic focusing operation is stabilized.

In the step 56, relative ratios R(1) and R(2) in the sampling areas are calculated. The relative ratio R(1) becomes A(1)/B(1) which is the ratio of the value of the memory A(1) to the value of the memory B(1), i.e., the ratio of the newest integrated value taken when the output of the first HPF 9 is used in the first sampling area A1 to the newest integrated value taken when the output of the second HPF 10 is used. Similarly, the relative ratio R(2) becomes A(2)/B(2) which is the ratio of the value of the memory A(2) to the value of the memory B(2).

An object of the endpoint switch processing routine (in the step 42) is to determine whether or not the focusing ring 3 reaches a near point or a ∞ point which is the limit of a rotatable range. More specifically, a reflecting plate on the side of the near point and a reflecting plate on the side of the ∞ point are respectively adhered to the focusing ring 3 such that the reflecting plates on the side of the near point and on the side of the ∞ point are opposed to the endpoint switch 5 fixed to a cabinet of a video camera when the focusing ring 3 reaches the near point or the ∞ point, to reflect light from a light emitting element in the endpoint switch 5 from each of the reflecting plates and receive the reflected light in the light receiving element in the endpoint switch 5, to determine whether each of the reflecting plates reaches a position opposed to the endpoint switch 5, i.e, the near point or the ∞ point. In addition, the near point and the ∞ point are distinguished based on the rotational direction of the focusing motor 4. Consequently, control is made such that the focusing motor 4 is reversed immediately after the focusing ring 3 reaches the near point or the ∞ point.

Description is now sequentially made of five routines which is the nucleus of the automatic focusing operation, i.e., the evaluating value stability confirming routine, the direction determining routine, the hill-climbing routine, the peak return routine and the evaluating value fluctuation monitoring routine.

Figure 7:
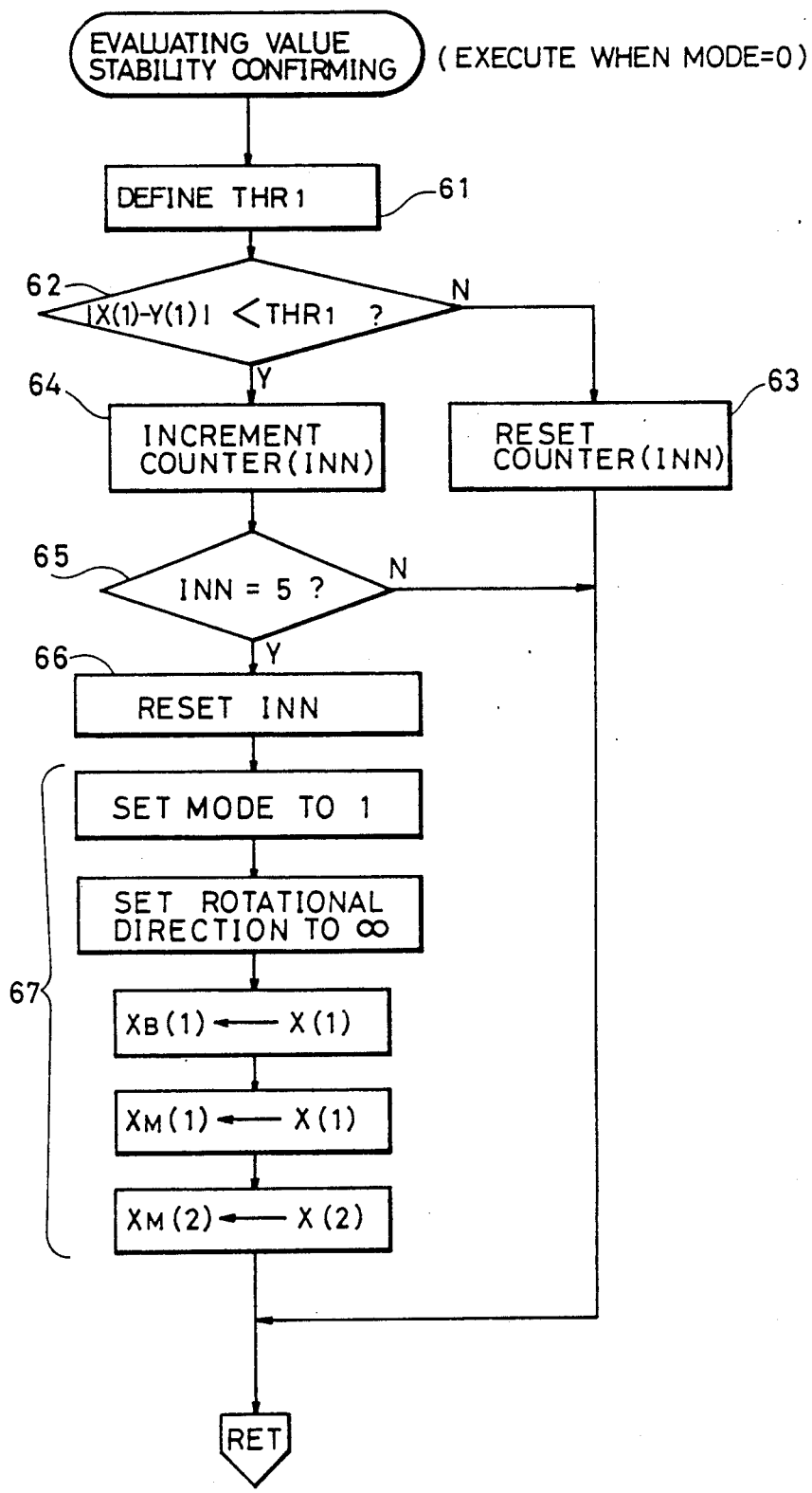
FIG. 7 is a flowchart showing an evaluating value stability confirming routine.

First, the evaluating value stability confirming routine is executed according to a flowchart of FIG. 7. This evaluating value stability confirming routine is executed when a power supply is turned on or an object changed to resume the automatic focusing operation, so that the operation mode code becomes "0".

First, in the step 61, a first threshold value THR1 is defined. Then, focus evaluating values X(1) and Y(1) in the current field and the previous field in the first sampling area A1 are compared with each other (in the step 62). When the difference therebetween is larger than the first threshold value THR1 first defined, it is considered that an evaluating value is not stable, so that a counter INN as described below is reset in the step 63. In order to execute this evaluating value stability confirming routine again when the automatic focusing routine is executed again in the next field, this routine is terminated with the operation mode code being "0".

On the other hand, when the difference between the focus evaluating values X(1) and Y(1) is the first threshold value THR1 or less, the counter INN is incremented in the step 64, that is, 1 is added to a count value thereof. In the step 65, it is determined whether or not the count value of the counter INN attains "5", that is, this state is continued over five fields. If the count value of the counter INN does not attain "5", the evaluating value stability confirming routine is terminated once. However, the operation mode code remains "0", so that this evaluating value stability confirming routine is executed again in the automatic focusing routine in the next field.

On the other hand, in the step 65, when it is determined that the state in which the difference between the focus evaluating values X(1) and Y(1) is smaller than the first threshold value THR 1 is continued over five fields, the counter INN is reset in the step 66, and the automatic focusing operation is initialized in the step 67. More specifically, in the step 67, the operation mode code is changed to "1" so as to execute the direction determining routine in the automatic focusing routine in the next field, the rotational direction of the focusing motor 4 is initialized to the direction of the ∞ point, the focus evaluating value X(1) in the first sampling area A1 in the current field is stored as a reference evaluating value $X_B(1)$ and a first maximum evaluating value $X_M(1)$, and the focus evaluating value X(2) in the second sampling area A2 in the current field is stored as a second maximum evaluating value $X_M(2)$, to terminate the evaluating value stability confirming routine.

Referring now to FIG. 8, description is made of a subroutine for carrying out a direction determining operation. An object of the direction determining routine is to determine whether a peak of a focus evaluating value is in the direction of the near point or the ∞ point with respect to the current position of a lens.

First, in the step 71, a second threshold value THR 2 is defined in advance. It is determined that the peak which is the maximum value of the focus evaluating value exists on the side of the rotational direction of the focusing motor 4 if the focus evaluating value X(1) in the current field is larger than a reference evaluating value $X_B(1)$ defined by a focus evaluating value in the final field in the focus evaluating value stability confirming routine, while it is determined that the peak exists on the side of the reverse direction if the focus evaluating value X(1) is smaller than the reference evaluating value $X_B(1)$ (in the step 72). In practice, the above described determination is made only when it is confirmed that the difference between the focus evaluating value X(1) in the current field and the reference evaluating value $X_B(1)$ exceeds the second threshold value THR 2 set in advance in consideration of the variation in the focus evaluating value due to noises or the like (in the step 73).

Figure 9:
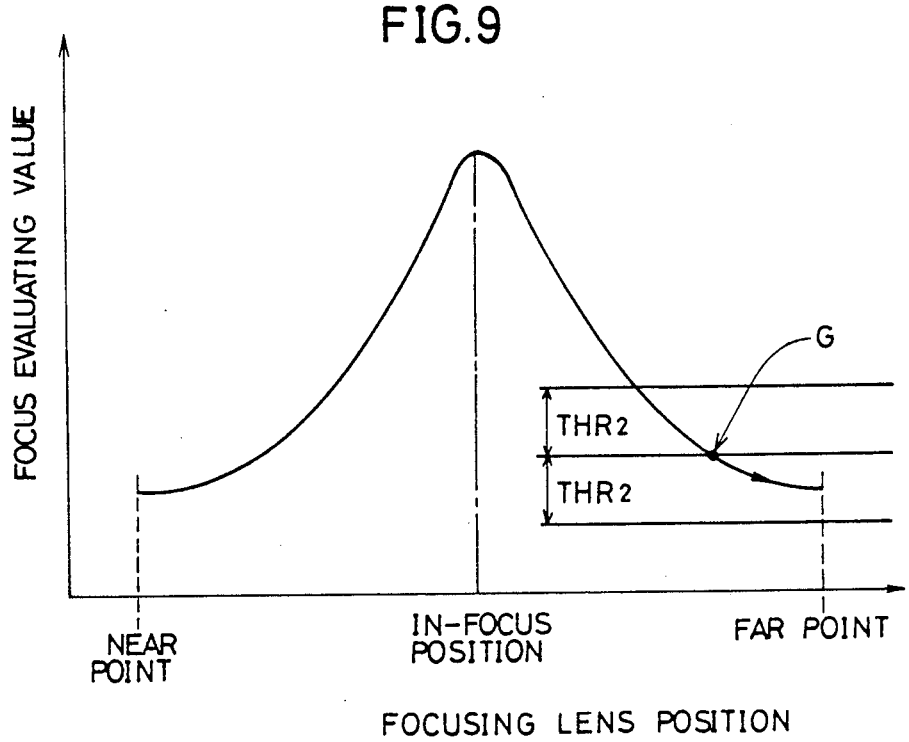
FIG. 9 is a graph showing a relation between the position of a focusing lens and a focus evaluating value.

Meanwhile, let's consider a case in which the direction determining routine is executed utilizing as the reference evaluating value $X_B(1)$ a focus evaluating value at G point where the focusing lens is greatly spaced apart from the in-focus position so that an object is significantly defocused, as shown in FIG. 9. More specifically, considering a case in which the focus evaluating value is small and the slope is not clear, if the focusing lens 2, i.e., the focusing ring 3 is moved in the direction of decreasing the focus evaluating value, the focusing lens 2 is moved to an endpoint ($\infty$ point) without exceeding the second threshold value THR 2 as represented by an arrow in FIG. 9, creating the impression that a picture is unclear. Therefore, only when the focus evaluating value $X(1)$ in the current field is larger than the reference evaluating value $X_B(1)$, the second threshold value THR is applied. On the other hand, when the focus evaluating value $X(1)$ is smaller than the reference evaluating value $X_B(1)$, the step 73 is skipped over to the step 74, in which a counter CHK is incremented for each field. When a count value of the counter CHK becomes 3, that is, it is determined in the step 75 that a state in which the focus evaluating value $X(1)$ is below the reference evaluating value $X_B(1)$ or is larger than the reference evaluating value $X_B(1)$ and the difference therebetween exceeds the second threshold value THR 2 is continued over three fields, it is determined in the step 76 whether or not focus evaluating values in three fields are all larger than the reference evaluating value $X_B(1)$. When it is determined that the focus evaluating values are all larger than the reference evaluating value $X_B(1)$, it is determined that the evaluating values tend to be increased. On the other hand, when the focus evaluating values are all smaller than the focus evaluating value $X_B(1)$, it is determined that the focus evaluating values tend to be decreased.

When the focus evaluating values tend to be increased, the rotational direction of the focusing motor 4 is maintained in the present condition. On the other hand, when the focus evaluating values tend to be decreased, the rotational direction of the focusing motor 4 is reversed in the step 77. In the steps 78 to 80, the focus evaluating value $X(1)$ in the current field is held as the maximum evaluating value $X_M(1)$, the counter CHK is reset, and the operation mode code is set to "2", thereby to execute the hill-climbing routine in the automatic focusing routine in the next field.

Additionally, when it has not been determined yet in the step 75 that the above described state is continued over three fields, the direction determining routine is terminated once with the rotational direction of the focusing motor 4 and the operation mode code being maintained in the present conditions, to execute the direction determining routine again in the automatic focusing routine in the next field.

On the other hand, it is determined in the step 73 that the difference between the focus evaluating value $X(1)$ and the reference evaluating value $X_B(1)$ does not exceed the second threshold value THR 2, the counter CHK is reset in the step 81, and it is determined in the step 82 whether or not the focus evaluating value $X(1)$ in the first sampling area A1 in the current field is larger than the maximum evaluating value $X_M(1)$ so far detected. If it is determined that the focus evaluating value $X(1)$ is larger than the maximum evaluating value $X_M(1)$, the maximum evaluating value $X_M(1)$ is updated by this focus evaluating value $X(1)$ and a first ring position counter $P(1)$ is reset so as to hold a mechanical position of the focusing ring 3 at the time of updating, in the step 83. In the step 84, it is determined whether or not the focus evaluating value $X(2)$ in the second sampling area A2 in the current field is larger than the maximum evaluating value $X_M(2)$ so far detected in the same area. If the focus evaluating value $X(2)$ is larger than the maximum evaluating value $X_M(2)$, the maximum evaluating value $X_M(2)$ is updated by this focus evaluating value $X(2)$ and a second ring position counter $P(2)$ is reset so as to hold the mechanical position of the focusing ring 3 at the time of updating, in the step 85. Assuming that a constant amount of rotation of the focusing motor 4 in a predetermined direction of rotation thereof is one step, both the counters $P(1)$ and $P(2)$ are adapted so as to be counted up every time the focusing motor 4 is driven by one step while being counted down every time the focusing motor 4 is driven by one step if the rotational direction thereof is reversed.

When it is determined in the step 86 that the focusing ring 3 is moved between both endpoints with the difference between the focus evaluating value $X(1)$ and the reference evaluating value $X_B(1)$ not exceeding the second threshold value THR 2 in the case that no object exists in the first and second sampling areas A1 and A2 or there exists an unclear object, if any, that is, a flag set by the endpoint switch 5 when the focusing lens 2 contacts with the near point while repeating the direction determining routine and a flag set by the endpoint switch 5 when the focusing lens 2 reaches the $\infty$ point are both set, the maximum evaluating values $X_M(1)$ and $X_M(2)$ in both the areas are compared with each other in the step 87. In making the comparison, the maximum evaluating value $X_M(1)$ is increased by four times in consideration of a 1:4 ratio of areas of the first and second sampling areas A1 and A2, to be normalized with respect to the maximum evaluating value $X_M(2)$. As a result of this above described comparison, when it is determined that the maximum evaluating value $X_M(2)$ is larger, a flag MAX2 used in the succeeding routine is set and a count value of the first ring position counter $P(1)$ is updated by a count value of the second ring position counter $P(2)$, in the step 88. The following automatic focusing operation is performed with respect to the second sampling area A2. In addition, when a value obtained by increasing the maximum evaluating values $X_M(1)$ by four times is larger, the automatic focusing operation is performed with respect to the first sampling area A1. The operation mode code is changed to "3" in the step 89, so that the return routine is executed in the automatic focusing routine in the next field. Furthermore, when it is not determined in the step 86 that the focusing ring 3 is entirely moved between the both endpoints, this direction determining routine is executed again in the automatic focusing routine in the next field.

Figure 10:
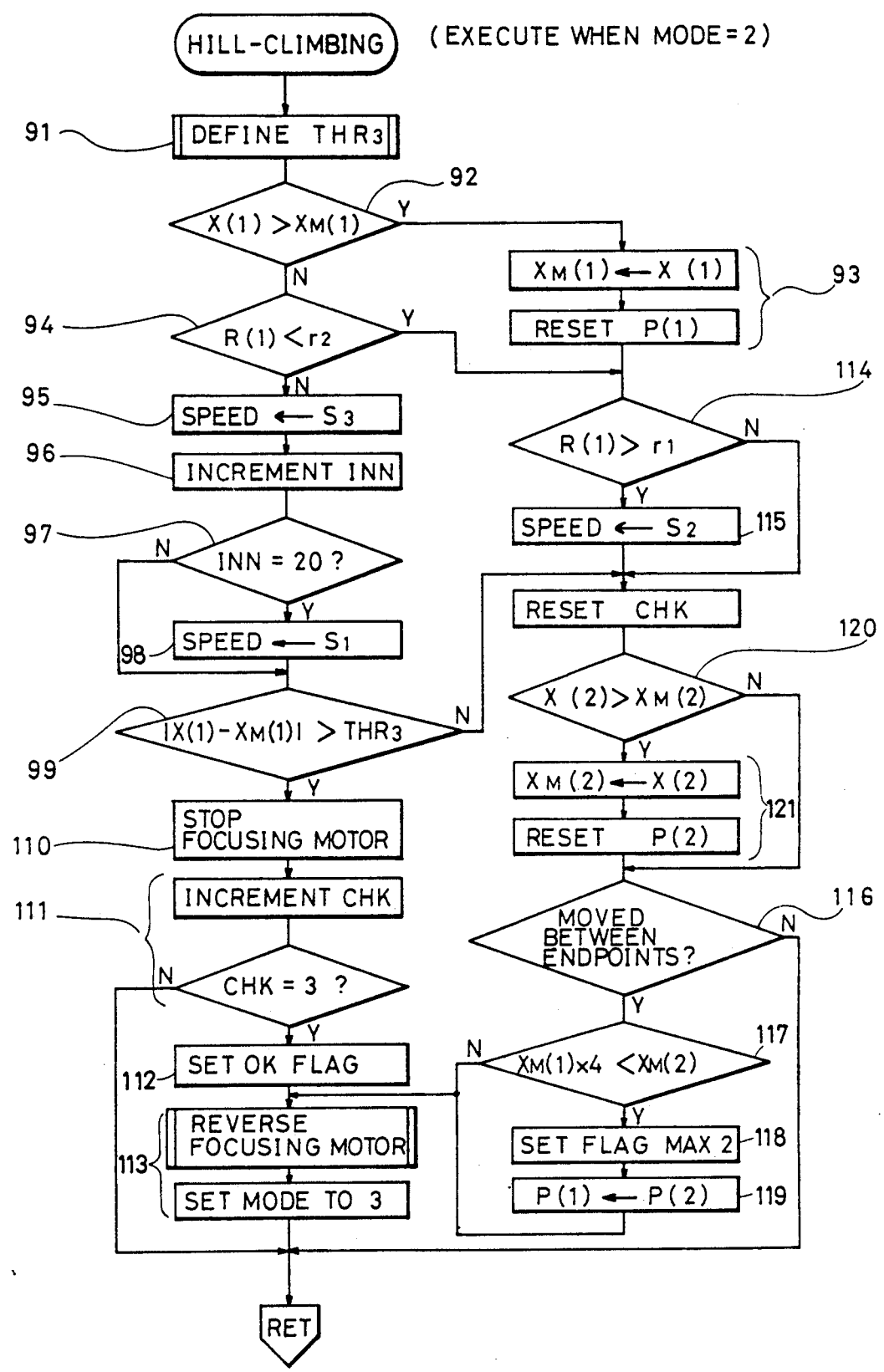
FIG. 10 is flowchart showing a hill-climbing routine.

Referring now to a flowchart of FIG. 10, description is made of an operation of the hill-climbing routine. An object of the hill-climbing routine is to discover a peak where a focus evaluating value reaches a maximum.

First, in the step 91, a fixed value is defined in advance as a third threshold value THR 3, to continue to rotate the focusing motor 4, i.e, the focusing ring 3 at a first speed s1 in a direction determined by the above described direction determining routine. Every time it is determined in the step 92 that the focus evaluating value $X(1)$ in the current field exceeds the maximum evaluating value $X_M(1)$ so far detected, the maximum evaluating value $X_M(1)$ is updated by the focus evaluating value $X(1)$ and the first ring position counter $P(1)$ is further reset, in the step 93.

On the other hand, considering a case in which it is determined in the step 92 that the focus evaluating value $X(1)$ in the current field is not larger than the maximum evaluating value $X_M(1)$ so far detected, when it is determined in the step 99 through the above described steps 94 to 98 that the focus evaluating value $X(1)$ is below the maximum evaluating value $X_M(1)$ by the third threshold value THR 3 or more, the focusing motor 4 is immediately stopped in the step 110. When it is determined in the step 111 that this state is continued with respect to focus evaluating values in successive three fields, a relative ratio OK flag is set in the step 112, and the rotational direction of the focusing motor 4 is reversed and the operation mode code is set to "3" in the step 113. Consequently, in the automatic focusing routine in the next field, the peak return routine is executed. A CHK in the step 111 is used for determining whether or not the state of $|X(1)-X_M(1)|>THR3$ is continued over three fields.

Figure 11:
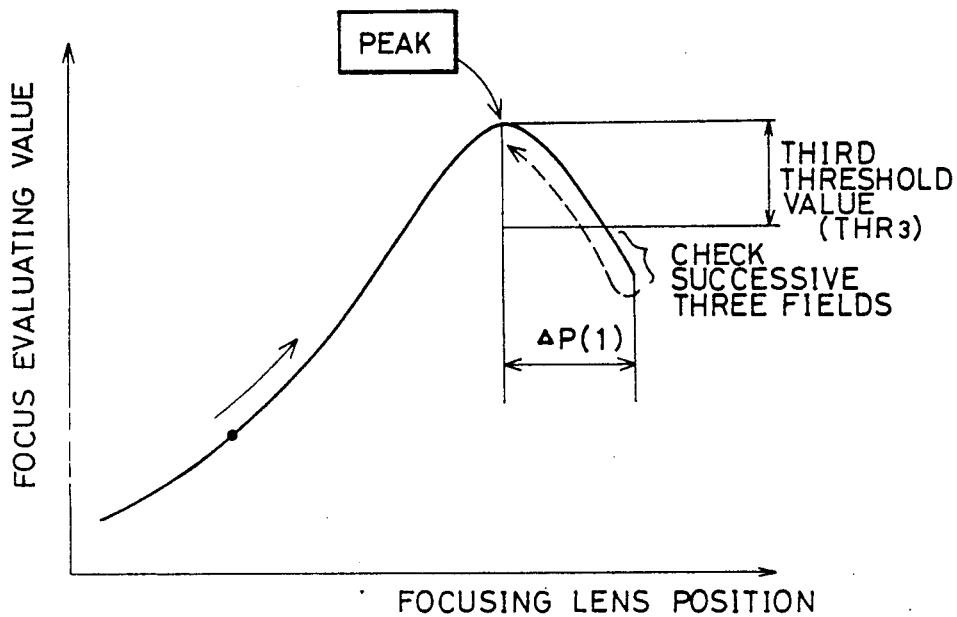
FIG. 11 is a graph showing the change in focus evaluating value at the time of return to a peak.
Figure 12:
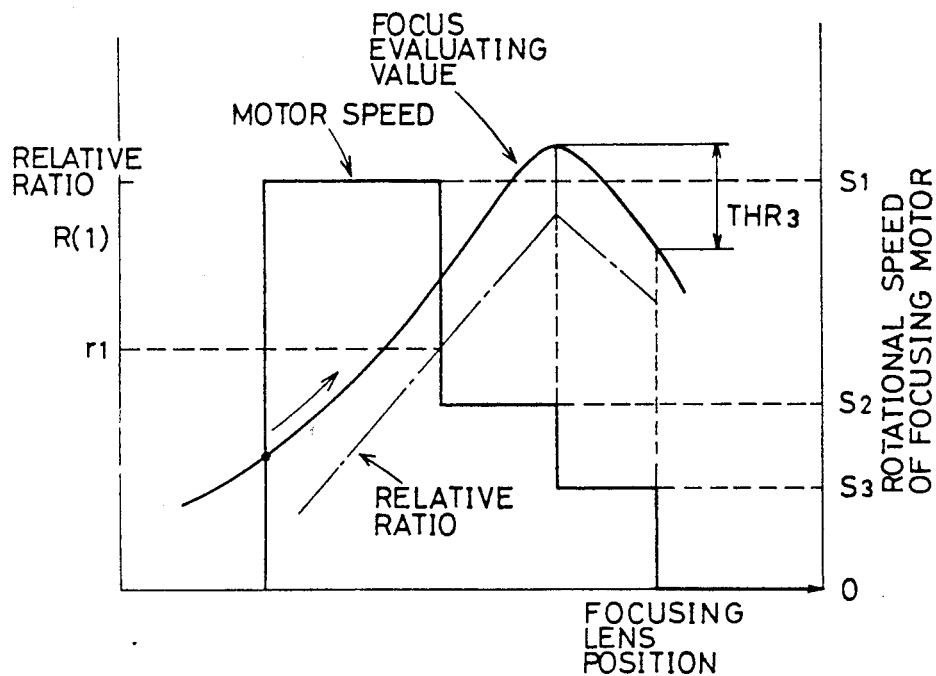
FIG. 12 is a graph showing a relation among the position of a focusing lens, a focus evaluating value, the rotational speed of a focusing motor, and a relative ratio of focus evaluating values.

Additionally, FIG. 11 is a graph showing the change in focus evaluating value to occur when the focusing lens is returned to a peak, and FIG. 12 is a graph showing a relation among the position of the focusing lens, a focus evaluating value, the rotational speed of the focusing motor, and a relative ratio of focus evaluating values. In FIG. 11, if an amount $\Delta P(1)$ of movement over the peak is too large, the degree of defocusing is increased, so that a picture becomes unclear. In order to make the amount $\Delta P(1)$ as small as possible, the rotational speed of the focusing motor 4 is controlled as follows: First, a relative ratio $R(1)$ is monitored for each field (in the step 114) during a hill-climbing operation. when the relative ratio $R(1)$ exceeds a first reference relative ratio r1 as shown in FIG. 12, it is considered that the focusing lens is close to the peak, so that the rotational speed of the focusing motor 4 is reduced from a standard speed s1 so far to an intermediate speed s2 lower than the standard speed s1 in the step 115. Then, when the focus evaluating value $X(1)$ is the maximum evaluating value $X_M(1)$ or less, the rotational speed of the focusing motor 4 is reduced to a speed s3 lower than the intermediate speed s2 in the step 95. Then, when it is determined in the step 99 that the difference between the focus evaluating value $X(1)$ and the maximum evaluating value $X_M(1)$ exceeds the third threshold value THR 3, the focusing motor 4 is stopped (in the step 110), and it is confirmed that the difference between the focus evaluating value $X(1)$ and the maximum evaluating value $X_M(1)$ is the third threshold value THR 3 or less over three fields (in the step 111).

However, when it is determined in the steps 96 and 97 that the above described hill-climbing operation is not completed after a lapse of 20 fields since the rotational speed of the focusing motor 4 was reduced to the speed s3, the rotational speed of the focusing motor 4 is returned to the standard speed s1 which is the highest speed in the step 98, to continue the hill-climbing operation. Consequently, the focusing motor 4 can be prevented from being operated for a long time with the speed thereof being reduced. In the steps 96 and 97, the counter INN, which is used for determining that the above described state is continued over 20 fields, is counted up for each field.

Furthermore, in the step 94, the relative ratio $R(1)$ is checked at the time point when the focus evaluating value $X(1)$ passes through the peak. When the relative ratio $R(1)$ is too small as a relative ratio in the peak, that is, a second reference relative ratio r2 or less, the program proceeds to the step 114, to force the hill-climbing routine to be also executed in the next field. Only when the relative ratio $R(1)$ at the peak is the second reference relative ratio R2 or more, the next peak return routine is started through the steps 95 to 113. Consequently, the frequency of a malfunction is decreased that the peak is erroneously recognized due to noises or the like so that the focusing lens 2 is stopped in a defocused state. In this case, the second reference relative ratio r2 is previously set as a relative ratio (for example, 0.1) at the time that the defocused state is considerably recognized.

Figure 13:
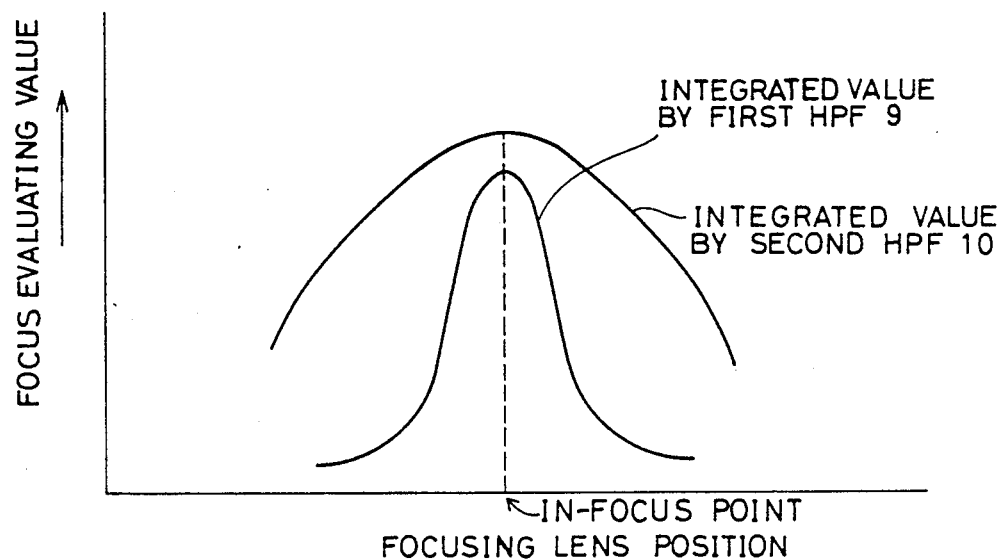
FIG. 13 is a graph showing a relation between the position of a focusing lens and an accumulated value of outputs of high-pass filters.
Figure 14:
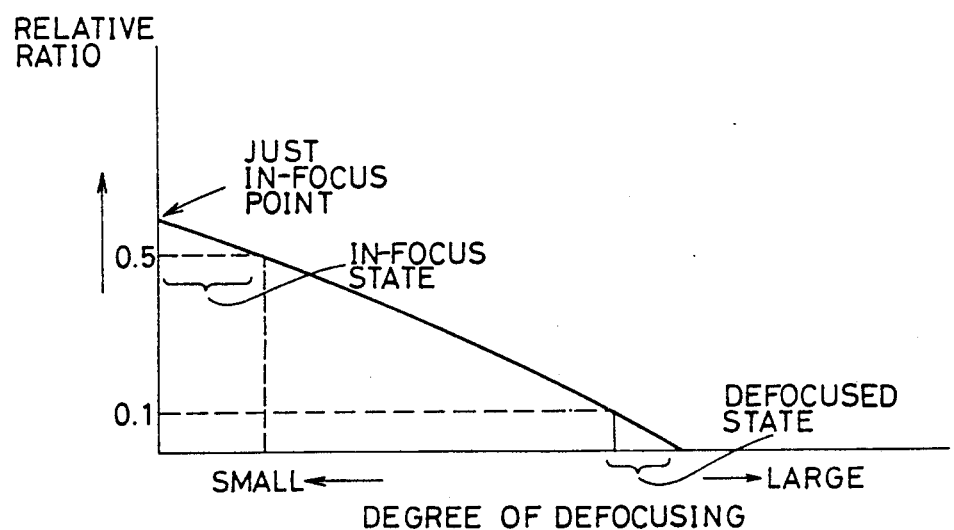
FIG. 14 is a graph showing a relation between a relative ratio of focus evaluating values and the degree of defocusing.

Meanwhile, description is now made in detail of the reason why the relation between the relative ratio $R(1)$ and the position of the focusing ring is linearly changed as shown in FIG. 1. This relative ratio $R(1)$ is a ratio of the integrated value corresponding to one field taken when the output of the first HPF in the first sampling area H is used as described above to the integrated value corresponding to one field taken when the output of the second HPF 10 therein is used. The relation between both the integrated values and the position of the focusing ring with respect to the same object is shown in FIG. 13. More specifically, the integrated value extracted using the output of the first HPF 9 having a higher cut-off frequency has a steep mountain-like shape, and the integrated value extracted using the output of the second HPF 10 having a lower cut-off frequency has a gentle mountain-like shape. When the relation between this relative ratio and the degree of defocusing of the object (that is, the amount of movement from the in-focus position or the amount of deviation) is graphically illustrated, a monotone decreasing characteristics curve as shown in FIG. 14 is obtained.

More specifically, this quantity of state which is this relative ratio is a function value by which the in-focus state of an object can be represented similarly to the focus evaluating value itself and is a kind of normalized quantity of state because it is represented by a ratio. Thus, the quantity of state has the property of not being affected by an environment where the object is placed. For example, when the illuminance of the object is changed, the absolute value of the focus evaluating value is changed. However, the relative ratio is not greatly changed. In general, the above described property is independent of the kind of object. Thus, this relative ratio can be utilized as a parameter indicating the degree of defocusing. When this monotone decreasing characteristic curve shown in FIG. 14 is expressed corresponding to the position of the focusing lens, a characteristic curve is obtained which almost linearly changes to the side of the near point and the side of the $\infty$ point with the in-focus position being a peak, at represented by a dot and dash line shown in FIG. 12.

Additionally, if and when also in this hill-climbing routine, it is determined in the step 116 that the focusing ring is moved between both the endpoints of the near point and the $\infty$ point with the difference between the focus evaluating value $X(1)$ and the maximum evaluating value $X_M(1)$ not exceeding the third threshold value THR3, as in the above described direction determining routine, values per unit area of the maximum evaluating values $X_M(1)$ and $X_M(2)$ in the sampling areas A1 and A2, i.e., $X_M(1) \times 4$ and $X_M(2)$ are compared with each other in the step 117. If $X_M(1) \times 4$ is larger, the program proceeds to the step 113 in the present condition. Contrary to this, if $X_M(2)$ is larger, the flag MAX2 is set (in the step 118), the count value of the first ring position counter P(1) is updated by the count value of the second ring position counter P(2) (in the step 119), so that the program proceeds to the step 113. The second sampling area A2 is selected as a focusing area in the next peak return routine.

Meanwhile, if the focus evaluating value X (2) in the current field in the second sampling area A2 is larger than the maximum evaluating value $X_M$ (2) so far detected (in the step 120), the maximum evaluating value $X_M(2)$ is updated by this focus evaluating value X (2) and the second ring position counter P(2) is reset (in the step 121).

Figure 15:
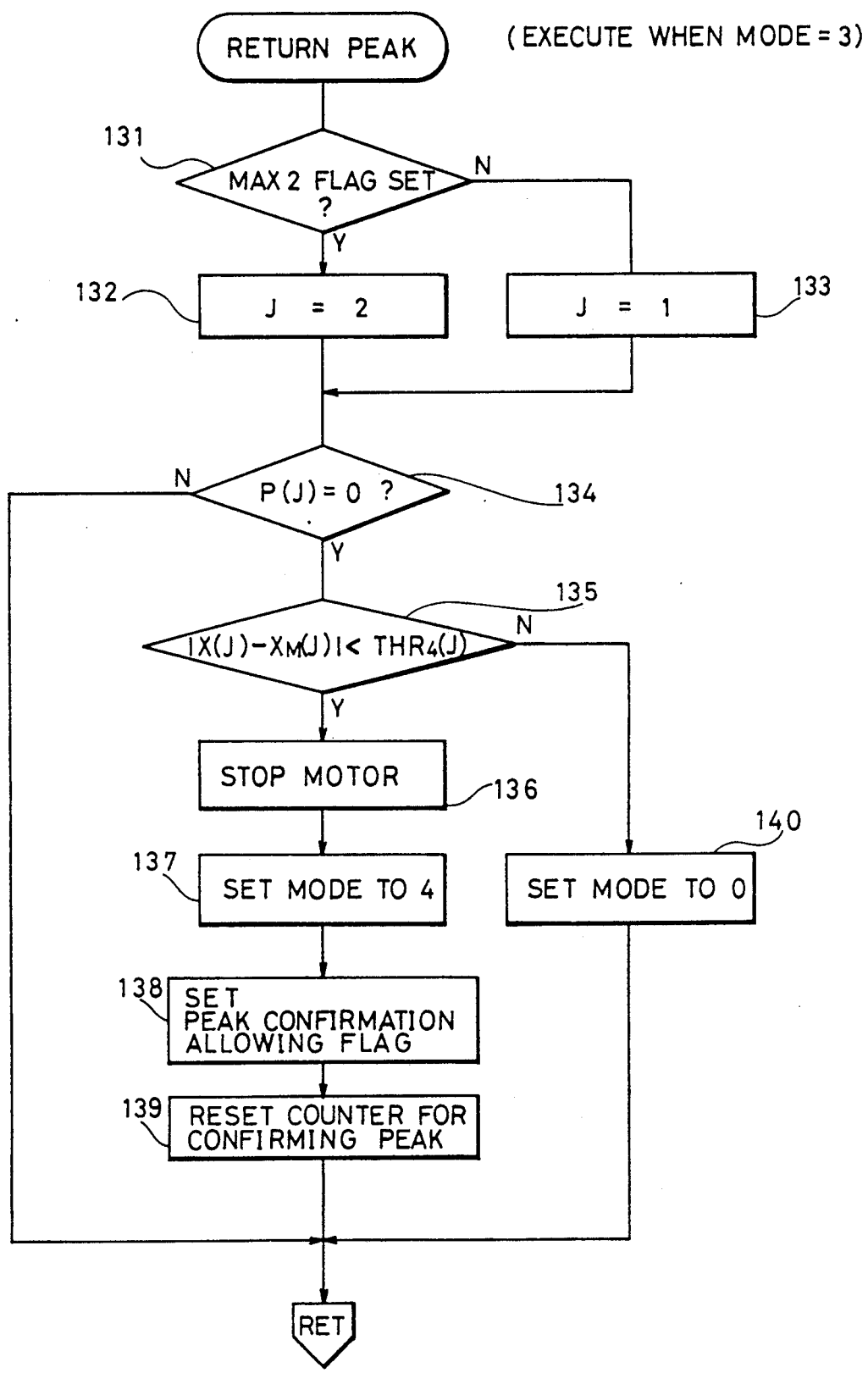
FIG. 15 is a flowchart showing a peak return routine.

Referring now to FIG. 15, description is made of an operation of the peak return routine for returning again the focusing ring 3 i.e., the focusing lens 2 to a peak position after recognizing the peak by the above described hill-climbing operation. The first ring position counter P (1) counted up for indicating the amount of movement over the peak in the hill-climbing routine or the first and second ring position counters P (1) and P (2) counted up when the focusing ring 3 is moved between both the endpoints in the direction determining routine or the hill-climbing routine is or are decremented by rotating the focusing ring 3 in the reverse direction in this peak return routine, that is, is counted down one at a time in response to rotation for each step of the focusing motor 4. When the count value of the ring position counter becomes zero, it is determined that the focusing lens 2 is returned to the peak position.

More specifically, in the step 131, it is determined whether or not the flag MAX2 is set in the above described hill-climbing routine or direction determining routine. The second sampling area A2 is designated as the subsequent focusing area in the step 132 if the flag MAX2 is in the set state, while the first sampling area A1 is designated as the subsequent focusing area in the step 133 if the flag MAX2 is not in the set state.

When it is determined in the step 134 that a count value of a ring position counter of a sampling area designated as a focusing area becomes zero, it is determined in the step 135 whether or not the difference between the focus evaluating value X (J) and a maximum evaluating value $X_M$ (J) in the sampling are selected as a focusing area is a previously set forth threshold value THR4 (J) or less. It is assumed that J=1 if the first sampling area A1 is designated as a focusing area, while J=2 if the second sampling area A2 is designated. When it is confirmed in the step 135 that the above described difference is the fourth threshold value THR4 or less, the focusing motor 4 is stopped in the step 136, and the operation mode code is set to "4" in the step 137 so as to execute the focus evaluating value fluctuation monitoring routine in automatic focusing routine in the next field. A peak confirmation allowing flag TL is set in the step 138, and a counter MC for confirming a peak is reset in the step 139, to terminate a series of auto-focus operations.

Additionally, when the difference between the focus evaluating value X (J) and the maximum evaluating value $X_M$ (J) is larger than the fourth threshold value THR4 (J), it is considered that the object is greatly displaced and the object itself is changed in a peak return operation, so that the operation mode code is set to "0" in the step 140, to resume the evaluating value stability confirming routine in the automatic focusing routine in the next field. It is assumed that an optimum value of the fourth threshold value THR4 (J) is individually set in advance corresponding to each sampling area.

Figure 16:
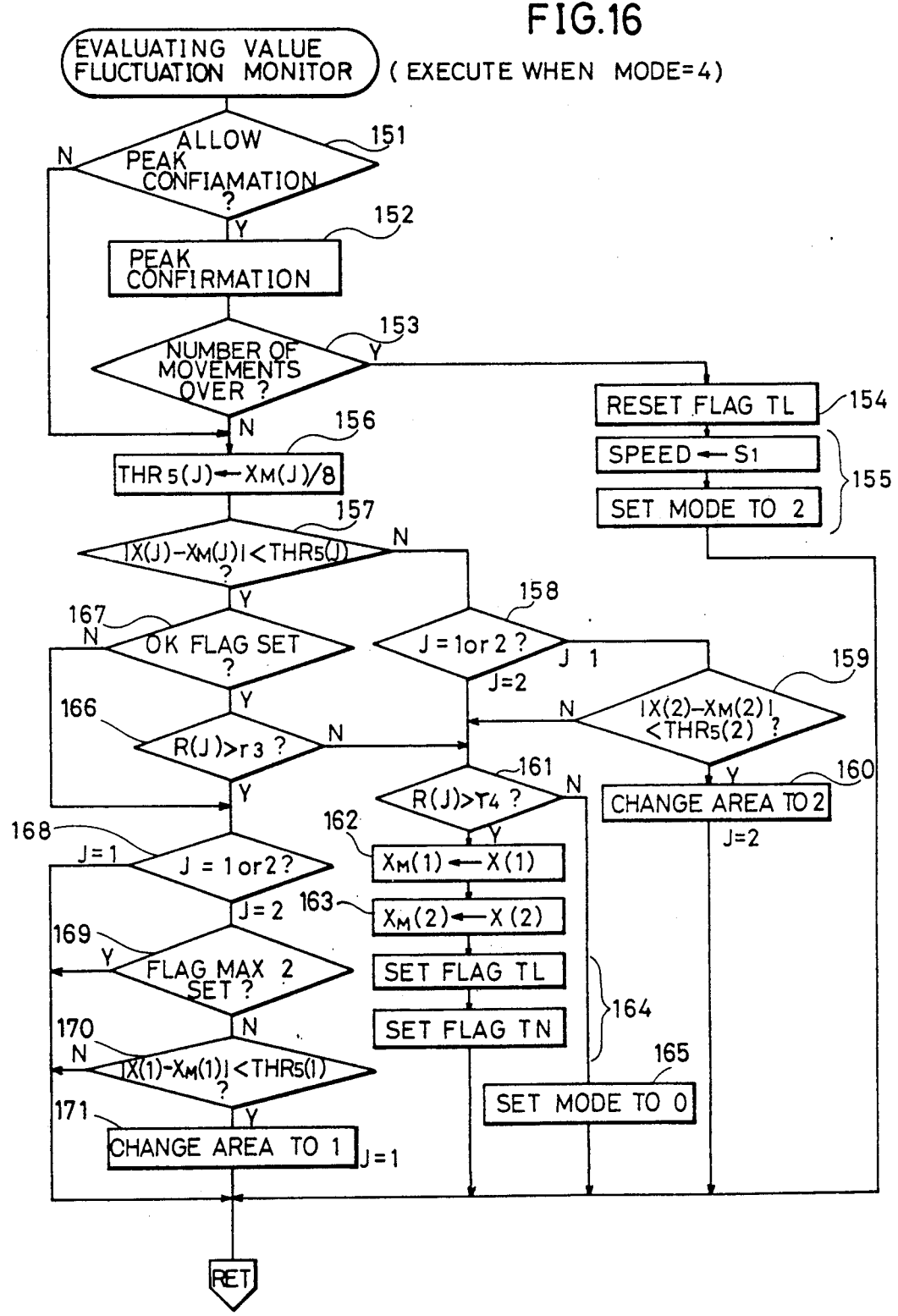
FIG. 16 is a flowchart showing an evaluating value fluctuation monitoring routine.

After the auto-focus operation is terminated, the focus evaluating value fluctuation monitoring routine is executed for monitoring the change of the object and determining whether or not the above described auto-focus operation must be resumed when the object changed. Referring to a flow chart of FIG. 16, description is made of an operation of this focus evaluating value fluctuation monitoring routine.

First, in a field immediately after this focusing evaluating value fluctuation monitoring routine is started, the set state of the peak confirmation allowing flag TL set immediately before the peak return routine is terminated is determined in the step 151 in order to examine whether or not there is an error in the peak detected in the above described series of auto-focus operations. In the first field after the peak return routine, the flag TL is in the set state, so that the peak confirming routine is executed.

Figure 17:
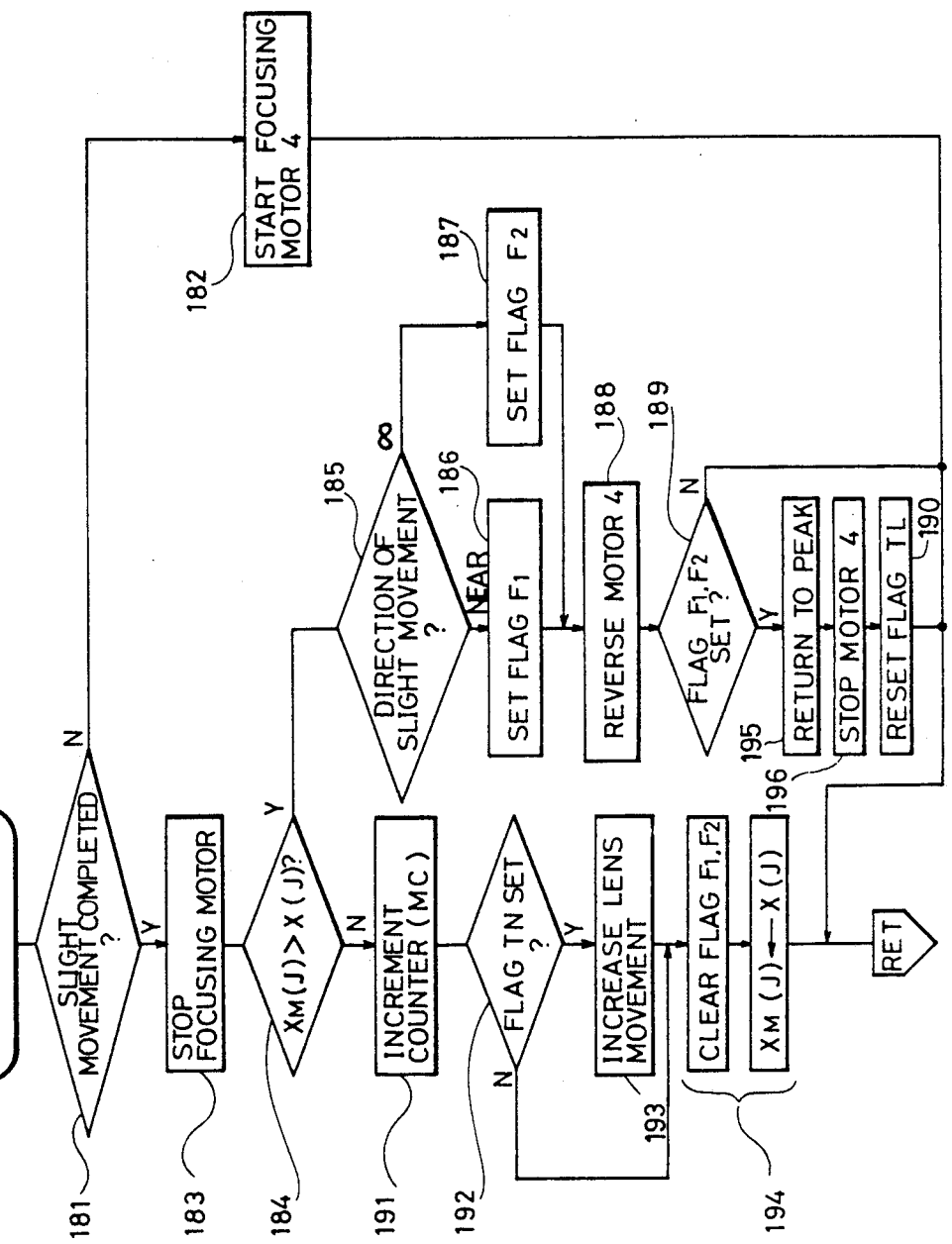
FIG. 17 is a flowchart showing a peak confirming routine.
Figure 18:
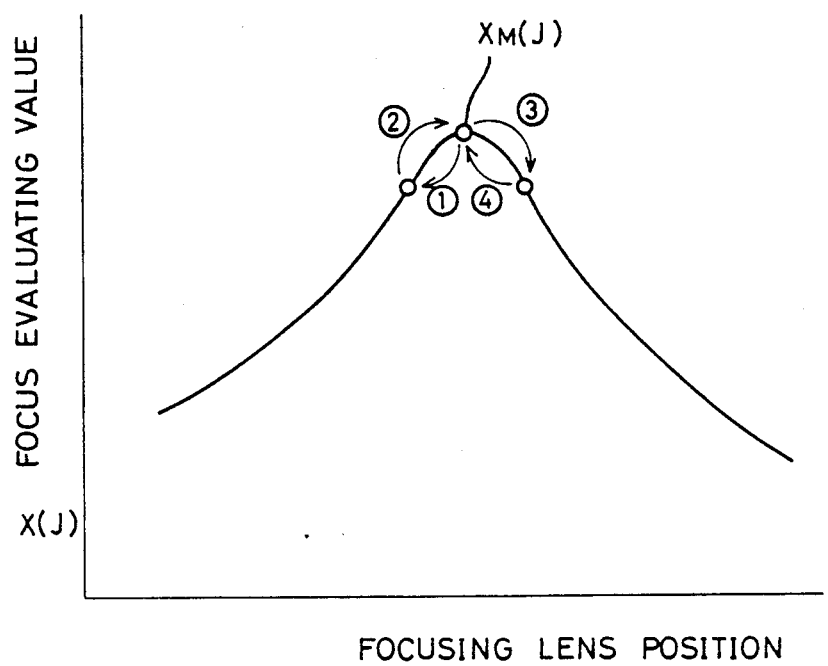
FIGS. 18 and 19 are graphs showing fluctuations in focus evaluating value caused by the change in position of a focusing lens.

This peak confirming routine is shown in a flow chart of FIG. 17. Referring to this flow chart, in the step 182, the focusing motor 4 is first driven by a small amount of such a degree that fluctuations in the angle of field cannot be recognized, for example, by one step of the focusing motor 4 which is a stepping motor in either direction, for example, in the direction of the near point (① in FIG. 18). When it is determined in the step 181 that slight movement of the lens is terminated, the focusing motor 4 is immediately stopped in the step 183, so that a focus evaluating value X (J) and a maximum evaluating value $X_M$(J) judged to be a peak in a focusing area in a field at the time of stopping are compared with each other in the step 184. In this case, the focusing area is a sampling area designated in the steps 131 to 133 shown in FIG. 15, according to the set state of the flag MAX2 used in the step 88 shown in FIG. 8 and in the step 118 shown in FIG. 10. The focusing area corresponds to the first sampling area A1 when J=1 while corresponding to the second sampling area A2 when J=2. As a result of the comparison in the step 184, when it is recognized that the focus evaluating value X (J) is smaller than the maximum evaluating value $X_M$(J) and it is recognized in the step 185 that the direction of slight movement of the lens is the direction of the near point, the flag F1 is set in the step 186. The rotational direction of the focusing motor 4 is reversed in the step 188, so that the lens 2 is slightly moved by two steps in the reverse direction i.e., in the direction of the ∞ point and continuous to be slightly moved after it is returned to the peak (② and ③) in FIG. 18). When it is confirmed again in the step 184 that the focus evaluating value X (J) is smaller than the maximum evaluating value $X_M$(J), the flag F2 is set in the step 187 through the step 185. The rotational direction of the focusing motor 4 is reversed again in the step 188, so that the lens 2 continuous to be slightly moved in the reverse direction i.e., in the direction of the near point. When it is determined in the step 189 that the flags F1 and F2 are both set, it is recognized that a focus evaluating value obtained by slightly moving the lens in both directions as represented by arrows in FIG. 18 is smaller than the maximum evaluating value, so that it is confirmed that there is no error in the position detected as a peak. In the step 195, the focusing motor 4 is driven in the direction of the near point by an amount excessively operated in the direction of the ∞ point over the peak, to return the lens to the peak again. The focusing motor 4 is stopped in the step 196, and the peak confirming flag TL is reset in the step 190, to terminate the peak confirming routine.

Figure 19:
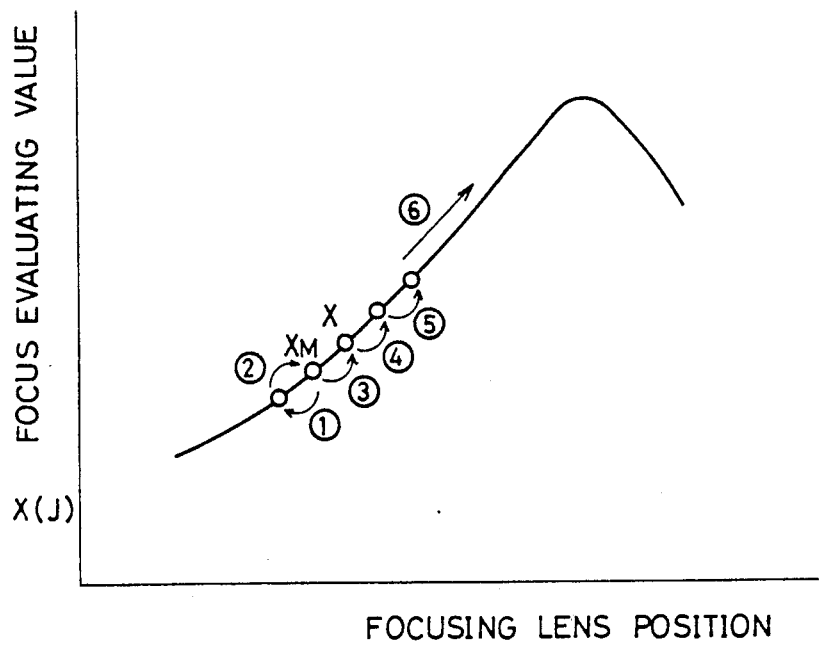
Figure 20A:
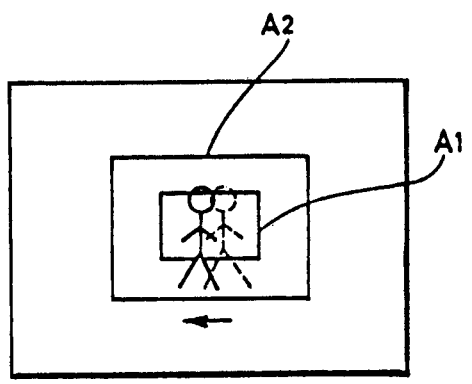
FIG. 20 is a diagram for typically explaining a manner in which an object moves.
Figure 20B:
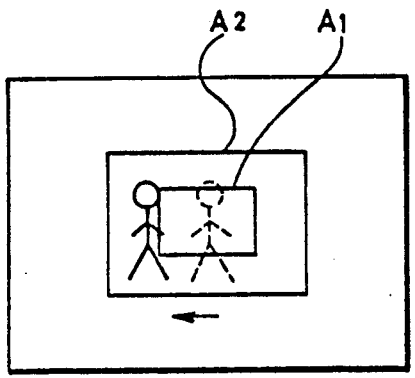
Figure 20C:
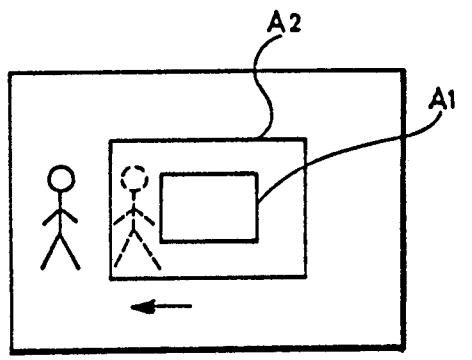
Figure 20D:
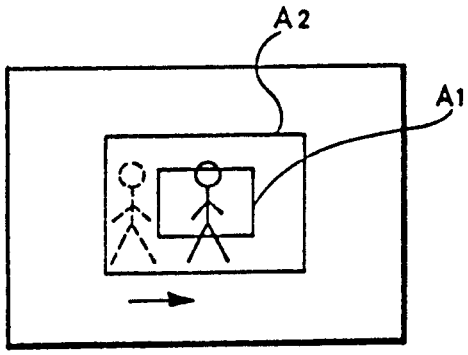

Additionally, as shown in FIG. 19, considering a case in which the peak is erroneously detected in the above described auto-focus operation, when the lens is slightly moved in either direction, the focus evaluating value X (1) becomes larger than the maximum evaluating value $X_M$ (1). Thus, the lens continuous to be slightly moved in the same direction without reversing the rotational direction of the focusing motor 4, to increment the number of times of movement which is the content of a counter MC representing the number of times of movement in the step 191.

Meanwhile, this peak confirming routine is executed in two kinds of cases: a case in which it is confirmed that the lens was surely returned to the peak immediately after the peak return routine is terminated and a case in which it is confirmed that the object changed after it is confirmed that the lens was returned to the peak. As described below, the cases differ from each other in that the peak confirming flag TN is set only in the latter case. In the step 192, the above described two kinds of cases are distinguished depending on whether or not this peak confirming flag TN is in the set state. When it is to be confirmed only whether or not the lens was surely returned to the peak immediately after the peak return routine is terminated, the step 193 as described below is skipped, so that a small amount of movement of the focusing motor 4 remains one step. The flags F1 and F2 are cleared in the step 194, so that the maximum evaluating value $X_M$(J) is updated by a new focus evaluating value X (J).

Thus, the peak confirming routine is repeated. Accordingly, when the lens is surely returned to the peak as shown in FIG. 18 immediately after the peak return routine is terminated, it is confirmed that the focus evaluating value changes as represented by arrows, so that lens is surely returned to the peak. On the other hand, when the lens is not surely returned to the peak as shown in FIG. 19, the focus evaluating value changes as represented by arrows, so that the maximum evaluating value $X_M$ (J) is updated for each change and the lens gradually approaches the in-focus position. In FIGS. 18 and 19, to ① to ⑥ indicate the order of movements.

In the evaluating value fluctuation monitoring routine, every time the peak confirming routine (in the step 152) is terminated, a count value of the counter MC is checked in the step 153. If the count value exceeds a predetermined allowable number of times, it is recognized that the peak is erroneously detected or the peak is moved due to the change in the object. More specifically, in FIG. 19, the allowable number of times is set to "3" so that it is recognized that the peak is erroneously detected after an operation of ⑤. When thus recognized, the peak confirmation allowing flag TL is reset in the step 154, and the rotational speed of the focusing motor 4 is switched to a standard speed s1 and the operation mode code is set to "2" in the step 155. Consequently, in the next automatic focusing routine, the above described hill-climbing routine is resumed. Considering a case in which the peak confirming routine is executed immediately after the peak return routine is terminated, when the peak is confirmed once, this operation is not carried out so long as the focus evaluating value does not fluctuate.

Description is now made of an operation of monitoring fluctuations in focus evaluating value caused by the change in object.

First, the amount of fluctuations of the focus evaluating value in the current field is defined based on the difference between the focus evaluating value X (J) in the sampling area designated as a focusing area in the above described peak return routine out of the first and second sampling areas A1 and A2 and the maximum evaluating value $X_M$ (J) so far detected in the sampling area. In the step 156, one-eighth of the maximum evaluating value $X_M$ (J) in the focusing area is defined as a fifth threshold value THR5 (J) in the focusing area. The above described amount of fluctuations in the focus evaluating value and the fifth threshold value THR5 (J) are compared with each other in the step 157. When the amount of fluctuations exceeds this fifth threshold value THR5 (J), it is recognized that the object changed.

It is experimentally determined in advance that the above described fifth threshold value THR5 (J) is set to one-eighth of the maximum evaluating value $X_M$ (J) in each of the sampling areas A1 and A2. If the fifth threshold value THR5 (J) is set large, for example, one-fourth of the maximum evaluating value $X_M$(J), it is difficult to detect the change of the object even if the object slightly changes. In addition, if the fifth threshold value THR5 (J) is set small, for example, to one-sixteenth of the maximum evaluating value $X_M$ (J), the change of the object is erroneously detected due to the effect of noises or the like even if the object does not change.

At the time point when it is recognized that the object changed, it is determined in the step 158 which of the first and second sampling areas is designated as a focusing area. If and when the first sampling area A1 is designated as the focusing area so that the above described change in the object is confirmed, that is, when the object changed at the time of monitoring with respect to the first sampling area A1, it is determined in the step 159 whether the focus evaluating value in the second sampling area A2 fluctuates, that is, which of the difference between the focus evaluating value X (2) and the maximum evaluating value $X_M$ (2) and the fifth threshold value THR5 (2) is larger. As a result, the difference is smaller than the fifth threshold value THR5 (2), it is considered that the object moves outside of the first sampling area A1 but stays in the second sampling area A2, as shown in FIG. 20 (b). Thus, in the step 160, the second sampling area A2 is selected as a focusing area serving as the subsequent focus evaluating value fluctuation monitoring area defining J=2, to continue a monitoring operation. Thus, movement of the object is monitored in the large and small sampling areas. Consequently, even if the object moves outside of a central portion of a picture after the in-focus state is achieved in the central portion thereof, the in-focus state can be maintained in a larger portion of the picture, so that the automatic focusing operation is stabilized. In FIGS. 20 (a) to 20 (d), a dotted line represents an object immediately before movement, and a solid line represents an object immediately after movement. In addition, FIG. 20 (a) shows a case in which the object moved in the first sampling area A1.

Figure 21:
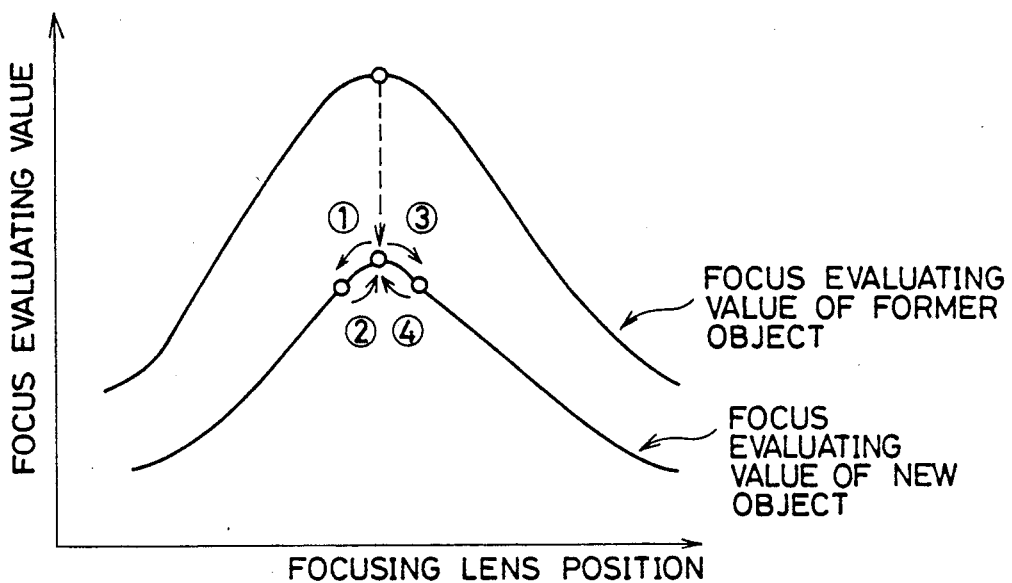
FIGS. 21 to 24 are graphs showing fluctuations in focus evaluating value caused by the change in object.
Figure 22:
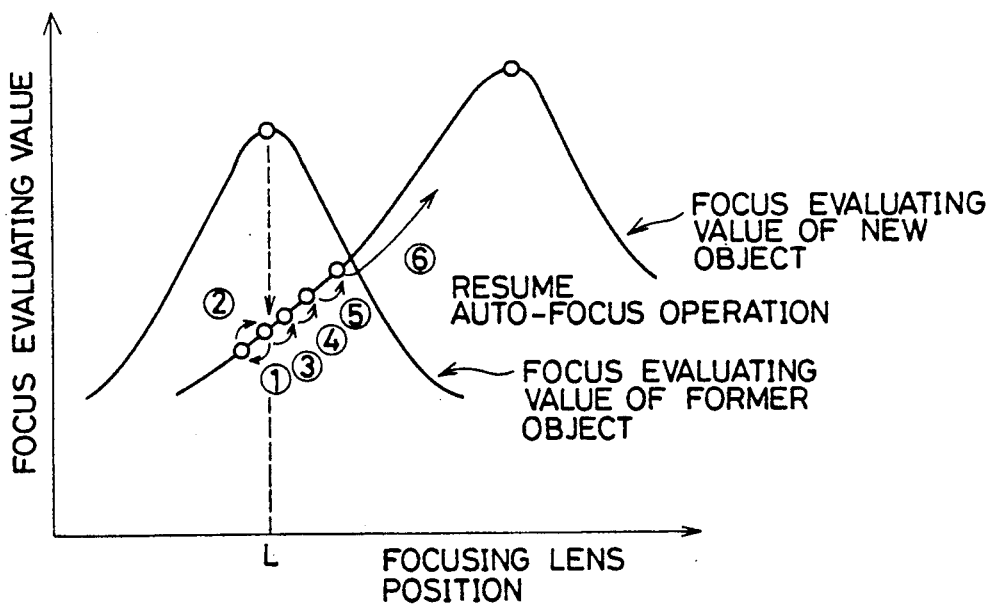

Then, it is determined in the step 159 that the difference between the focus evaluating value X (2) and the maximum evaluating value $X_M$ (2) is the fifth threshold value THR5 (2) or more, it is considered that the object also moved outside of the second sampling area A2, as shown in FIG. 20 (c). Thus, in such a case, the autofocus operation must be resumed with respect to a new object. However, when fluctuations in the focus evaluating value in this case are due to mere horizontal movement and vertical movement of a camera which is not caused by the change in distance from the object to the lens or due to the change in brightness of the entire picture, it is considered that the focus evaluating value changes as shown in FIG. 21. In such a case, when a new in-focus operation is started, the picture becomes unclear. In order to distinguish the case as shown in FIG. 21 and the case in which the distance from the object to the lens is actually changed as shown in FIG. 22, when fluctuations in the focus evaluating value in the second sampling area A2 are detected, the maximum evaluating values $X_M(1)$ and $X_M(2)$ are updated by the focus evaluating values $X(1)$ and $X(2)$ in the current field in the steps 162 and 163, and the peak confirmation allowing flag TL for executing the peak confirming routine in the next filed and the peak confirming flag TN are further set in the step 164. Consequently, the peak confirming routine is resumed in the next field in the step 152, to determine whether fluctuations in the focus evaluating value are due to the change in shape of a pattern of the object or due to the change in distance.

Meanwhile, if and when the distance from the object to the lens is actually changed, it is desirable that the auto-focus operation is quickly resumed. Therefore, if it is determined in the step 184 in the peak confirming routine that the focus evaluating value $X(J)$ in the current field is the maximum evaluating value $X_M(J)$ or more and the focusing motor 4 is rotated by a very small amount in the same direction, it is further determined in the step 192 that the peak conforming flag TN at the time of fluctuations in the evaluating value is set. When it is determined that the peak confirming flag TN is set, the very small amount of rotation of the focusing motor 4, i.e., a very small amount of movement of the focusing lens 2 is gradually increased, for example, one step, three steps, five steps, . . . every passage through the step 193, as compared with a case in which the peak confirming flag TL is not set, that is, the peak confirming routine is executed so as to confirm the peak immediately after the peak return routine is terminated. Consequently, as shown in FIG. 22, when the position of the lens is changed from a lens position L which is a peak in the case of a former object before the change in distance to a peak in the case of a new object after the change through the lens positions ①, ②, ③, ④, ⑤ and ⑥, the lens is displaced one step at a time in the lens positions ①, ②, and ③, the lens is displaced three steps at a time in the lens position ④, and the lens is displaced five steps at a time in the lens position ⑤, so that the lens quickly approaches an in-focus position. Similarly, an allowable number of times movement is set smaller than that in a case in which the peak confirming flag TN is in the reset state. In addition, in a case shown in FIG. 21, even if characteristics of the focus evaluating value in the case of the former object are changed to those in the case of the new object, operations in the step 185 and subsequent steps ar carried out according to the determination in the step 184 shown in FIG. 17, so that the lens is immediately held in the original in-focus position.

Figure 23:
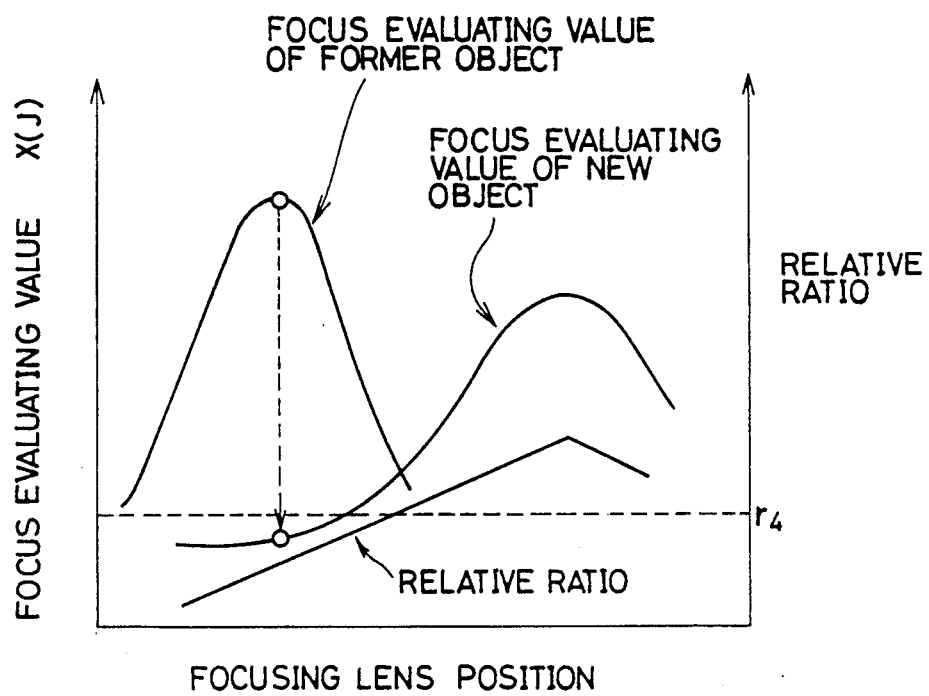

Meanwhile, the above described peak confirming operation requires that the slope of a moutain-like curve of a focus evaluating value is clear and the difference between focus evaluating values caused by slight movement of the lens can be detected, as shown in FIGS. 21 and 22. Thus, as shown in FIG. 23, in a portion where the slope of a mountain-like curve of characteristics of the focus evaluating value in the case of the new object is unclear, a malfunction is liable to occur. Therefore, in the step 161 shown in FIG. 16, when it is determined that a relative ratio $R(J)$ ($J=1$ or 2) in a sampling area currently designated as a focusing area is smaller than a fourth reference relative ratio r4 experimentally set in advance as a limit value at which it is recognized that a defocused state is not achieved, it is determined to be a portion where the slope is unclear as shown in FIG. 23, the operation mode code is immediately set to "0" in the step 165 without confirming a peak. Accordingly, in the automatic focusing routine in the next field, the focus evaluating value stability confirming routine is resumed.

Description is now made of a monitoring operation to occur when the difference between the focus evaluating value $X(J)$ and the maximum evaluating value $X_M(J)$ is the fifth threshold value THR5 (J) or less, that is, the object does not change, as a result of the determination in the step 157.

Figure 24:
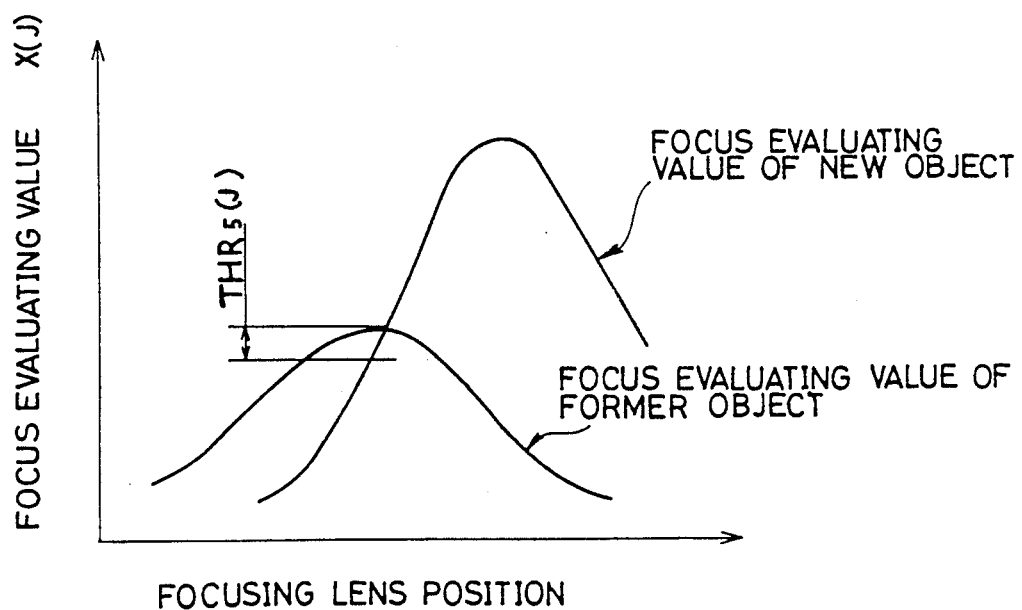

As shown in FIG. 24, a case is considered in which the focus evaluating value does not fluctuate but the object changes. Considering a case in which fluctuations in the focus evaluating value are not detected, if it is determined in the step 166 that the relative ratio $R(J)$ in the current field is smaller than the third reference relative ratio r3 which is a threshold value which is considered to be significantly low as a peak, the program proceeds to the step 161, to perform the same processing as that performed when it is recognized that the focus evaluating value fluctuates. However, the determination of this relative ratio is limited to a case in which it is determined in the step 167 that a relative ratio at a peak in the case of an object which is currently brought into focus is the second reference relative ratio r2 or more in the above described hill-climbing routine, that is, the relative ratio OK flag is set.

Then, it is determined in the step 168 which of the first and second sampling areas A1 and A2 is designated as the current focusing area, and it is further determined in the step 169 whether the flag MAX2 is set. If the flag MAX2 is not set, that is, the focus evaluating value in the first sampling area A1 is larger as a focus evaluating value per unit area, it is determined in the step 170 whether or not the difference between the focus evaluating value $X(1)$ and the maximum evaluating value $X_M(1)$ is the fifth threshold value THR5 (1) or less. If the difference is the fifth threshold value THR5 or less, it is determined that the object is returned from the state shown in FIG. 20 (b) to the state shown in FIG. 20 (d), that is, is returned to the first sampling area A1, to select the first sampling area A1 as a focusing area which is a focus evaluating value fluctuation monitoring area in the step 171 to continue a monitoring operation. Thus, immediately after the object is returned to the first sampling area A1, the smaller first sampling area is designated as the focusing area, thereby decreasing the possibility that the focus depends on the background of the larger second sampling area.

Meanwhile, in each drawing, the position of the focusing lens in the axis of abscissa corresponds to the distance from a front end position much spaced apart from the image sensor to the focusing lens in the direction of an optical axis in a stoke which is movable in the direction of the optical axis of the focusing lens.

As described in the foregoing, the auto-focus operation in the automatic focusing routine and an operation for confirming the change in the object after the in-focus state and correcting deviation are completed.

Additionally, as shown in the main routine, the automatic focusing routine is ceased every 32 fields, so that an automatic iris operation is carried out.

Figure 25:
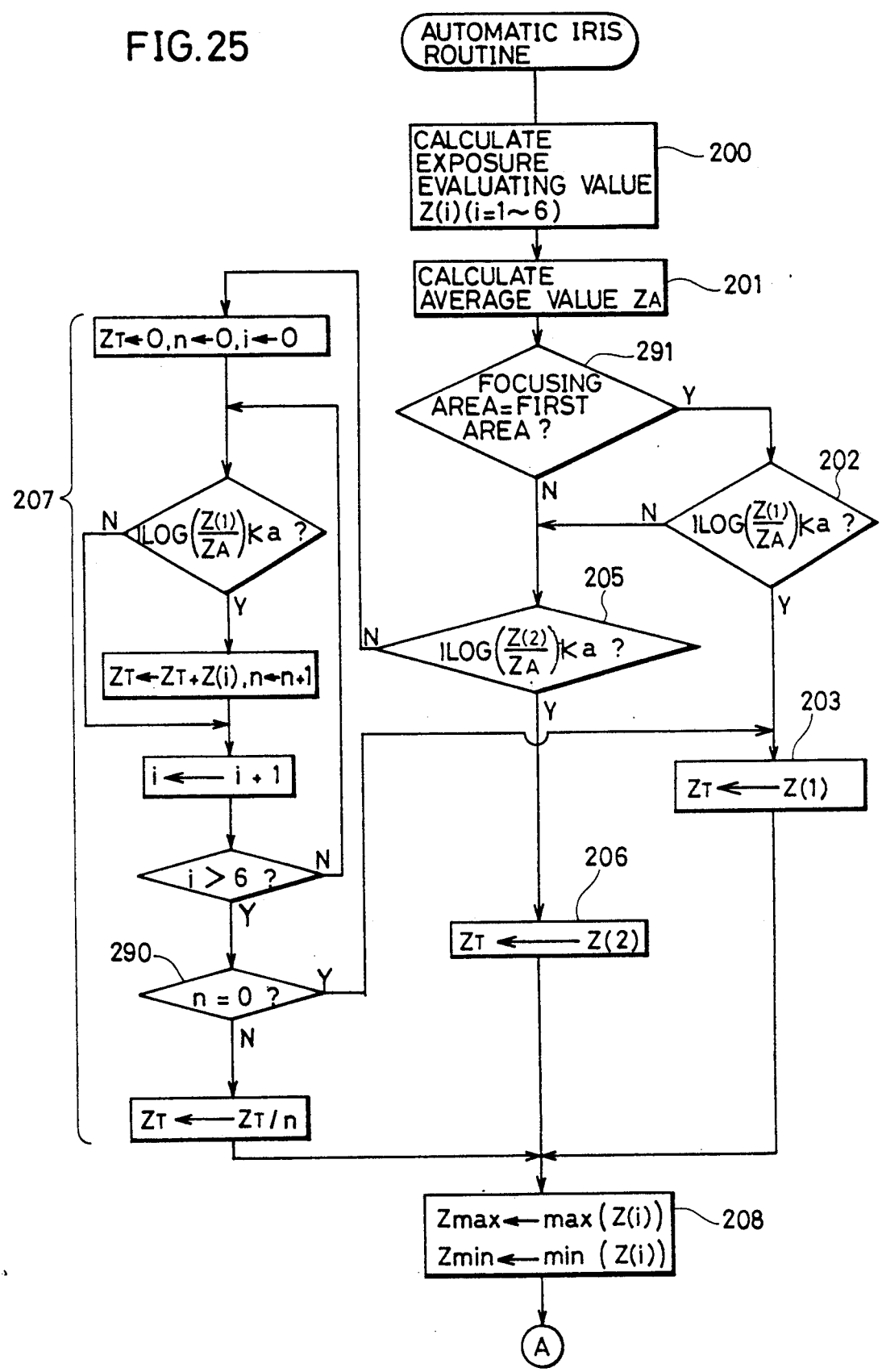
FIGS. 25 and 26 are flowcharts showing a routine of an automatic iris operation.
Figure 26:
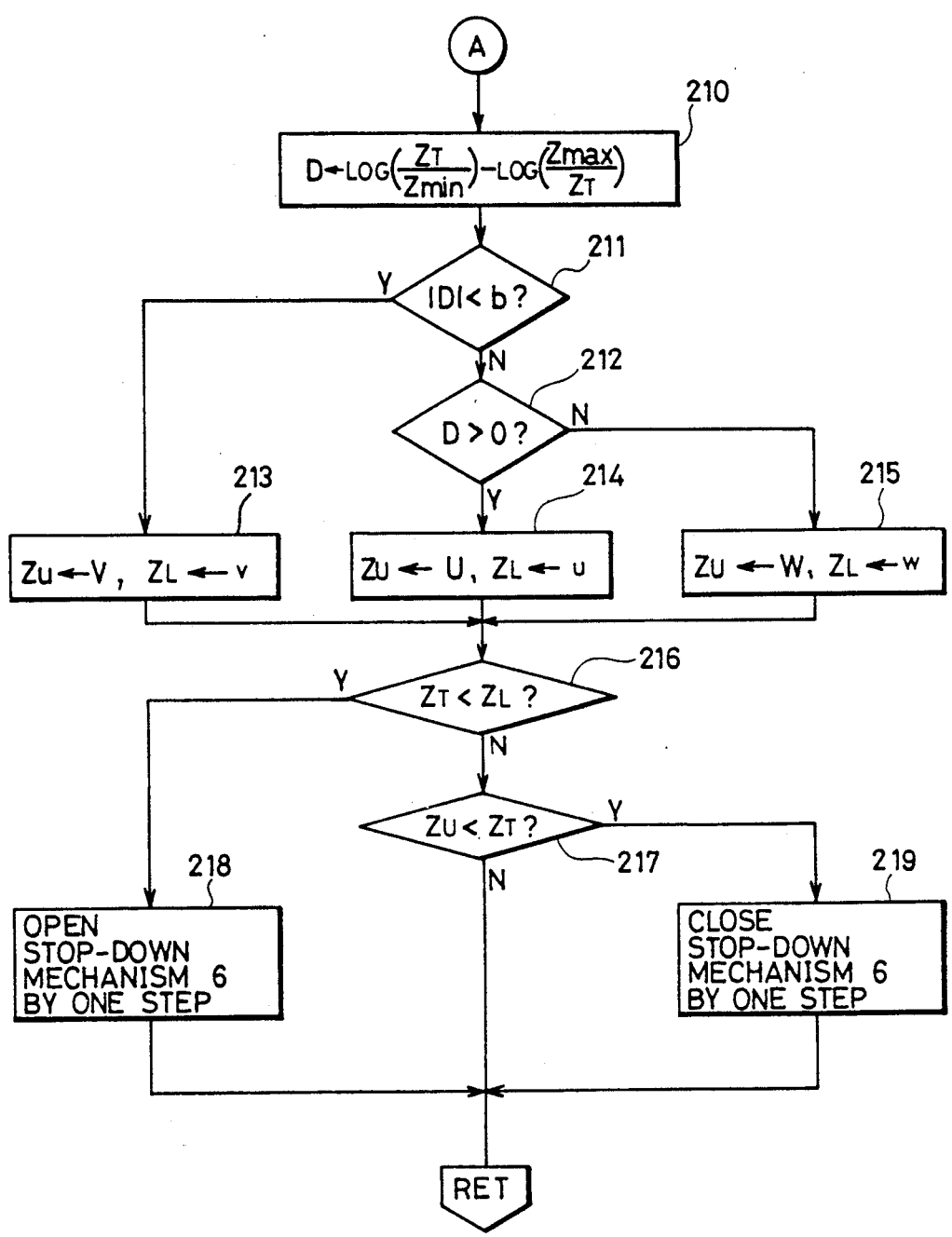

Referring now to flow charts of FIGS. 25 and 26, description is made of an automatic iris operation according to an embodiment of the present invention.

When it is determined in the step 33 in the main routine shown in FIG. 3 that the count value of the counter AECNT becomes zero, that is, when 32 fields have elapsed since the auto-focus operation was started, an automatic iris routine shown in FIG. 25 is executed. First, values obtained by respectively normalizing integrated values DATA (1), DATA (2), ..., DATA (6) corresponding to one field in first to sixth sampling areas A1, A2, ..., A6 of a luminance signal, which passed through the LPF11, read in the step 30 in the main routine by area of corresponding sampling areas, that is, integrated values per unit area obtained by dividing the integrated values DATA(1), DATA(2), ..., DATA(6) by areas SM1, SM2, ..., SM6 of the first to sixth sampling areas A1, A2, ..., A6 are calculated in the step 200 as exposure evaluating values Z (1), Z(2), ..., Z (6) in the areas. However, since the second sampling area A2 is an area including the first sampling area A1 as described above, the exposure evaluating value Z (2) is affected by the first sampling are A1 according to the above described calculating method. Therefore, the exposure evaluating value Z (2) in an area excluding the first sampling area A1 from the second sampling area A2 is calculated by the following equation:

$$Z(2) = (DATA(2) - DATA(1))/(SM2 - SM1)$$

Furthermore, the average value in the entire picture is calculated in the step 201 as an average exposure evaluating value $Z_A$ by the following expression:

$$(Z(1) + Z(2) + Z(3) + Z(4) + Z(5) + Z(6))/6$$

Then, an object evaluating value $Z_T$ is determined which represents a luminance level of this picture and is the basis of exposure control. First, it is determined in the step 291 whether or not the first sampling area A1 is used as a focusing area in an automatic focusing operation in the previous field, that is, whether or not a main object exist in the first sampling area A1. If the first sampling area A1 is designated as a focusing area, it is determined whether or not the exposure evaluating value Z (1) in the first sampling area A1 is within a predetermined allowable range with respect to the average exposure evaluating value $Z_A$. More specifically, it is determined in the step 202 that $|LOG(Z(1)/Z_A)|$ which is the absolute value of a logarithm ratio of both the exposure evaluating values is a predetermined value a or less, this exposure evaluating value Z (1) is considered to be an object evaluating value $Z_T$ and this first sampling area A1 is considered to be a priority area, in the step 203.

Furthermore, if and when the first sampling area A1 is not selected as a focusing area because the main object moves outside of the first sampling area A1 or it is determined in the step 202 that an abnormal luminance portion exists in the first sampling area A1 even if the first sampling area A1 is selected so that a logarithmically compressed value of the ratio of the exposure evaluating value Z (1) to the average evaluating value $Z_A$ is not the predetermined value a or less, it is determined in the step 205 whether the exposure evaluating value Z (2) in an area excluding the first sampling area A1 from the second sampling area A2 is within a predetermined range with respect to the average exposure evaluating value $Z_A$. When it is determined in the step 205 that $|LOG(Z(2)/Z_A)|$ is the predetermined value a or less, this exposure evaluating value Z (2) is considered to be an object evaluating value $Z_T$ in the step 206.

Additionally, when it is determined in the step 205 that $|LOG(Z(2)/Z_A)| < a$ is not satisfied, the average of values within a predetermined range with respect to the average exposure evaluating value $Z_A$ out of the exposure evaluating values Z (i) (i = 1 to 6) in the areas, that is, values at which $|LOG(Z(i)/Z_A)|$ is the predetermined value a or less is calculated as an object evaluating value $Z_T$ in the step 207. When it is determined in the step 290 that any one of the exposure evaluating values in all the areas is not the predetermined value a or less, the exposure evaluating value Z (1) in the first sampling area A1 is considered to be the object evaluating value $Z_T$. In addition, in the step 208, the maximum value and the minimum value out of the exposure evaluating values Z (i) (i = 1 to 6) are respectively set as values Zmax and Zmin which are required for determination of exposure.

When it is determined in the steps 202, 205 and 207 whether each of the exposure evaluating values is within a predetermined allowable range with respect to the average exposure evaluating value $Z_A$ or is greatly different from the average exposure evaluating value $Z_A$ outside of the range, it does not matter if the ratio of both the values is merely used. However, in the present embodiment, the exposure evaluating value is compared with the predetermined value a after logarithm compression in consideration of the fact that a dynamic range of the ratio of both the values is extremely wide.

As described in the foregoing, when an object evaluating value which is an exposure evaluating value in a sampling area used in carrying out the automatic iris operation is determined out of exposure evaluating values in a plurality of sampling areas, an exposure evaluating value in a sampling area designated as a focusing area at the time of determination is given priority. For example, if the first sampling area A1 is designated as a focusing area, an exposure evaluating value in this first sampling area is given priority. In addition, if the second sampling area A2 is designated as a focusing area, an exposure evaluating value in an area excluding the first sampling area from the second sampling area is given priority. However, this is limited to a case in which no extremely high luminance portion such as a light source or no extremely low luminance portion such as deep green, i.e., no abnormal luminance portion exists in the area and a logarithmically compressed value of the ratio of an exposure evaluating value to the average evaluating value $Z_A$ is the predetermined value a or less. When abnormal luminance portions exist in both the first and second sampling areas A1 and A2, the average value of exposure evaluating values in areas where no abnormal luminance portion exists is judged to be an object evaluating value, and the corresponding area is considered to be the basis of the automatic iris operation.

Determination of a diaphragm opening based on the value set as described above is made according to a flow chart of FIG. 26. First, in the step 210, the logarithm of the ratio of the object evaluating value $Z_T$ to the maximum evaluating value Zmax, LOG (Zmax/$Z_T$), and the logarithm of the ratio of the object evaluating value $Z_T$ to the minimum evaluating value Zmin, LOG ($Z_T$/Zmin), are calculated, and the difference therebetween, LOG ($Z_T$/Zmin) −LOG (Zmax/$Z_T$), is provided as a light and darkness determining value D. This light and darkness determining value D is a parameter for determining whether a main object for determining the object evaluating value $Z_T$ is relatively bright or dark in a picture. If the main object is bright and the object evaluating value $Z_T$ is relatively large, LOG ($Z_T$/Zmin) which is the first term is increased and LOG (Zmax/$Z_T$) which is the second term is decreased, so that the light and darkness determining value D is increased. On the other hand, if the object evaluating value $Z_T$ is relatively small, the first term is decreased and the second term is increased, so that the light and darkness determining value D is decreased.

Meanwhile, the reason why the logarithm of the ratio of the evaluating values in calculating this light and darkness determining value D is that recognition of brightness by vision of a human being is generally achieved such that visual brightness is linearly changed if a luminous level of an actual object is exponentially increased, for example, increased by two times, four times and eight times in that order.

When it is determined in the step 211 that $|D|<b$ holds between the determining value D and the predetermined value b (b>0), it is determined that the luminance of an object in a picture is intermediate, to respectively set the upper limit $Z_U$ and the lower limit $Z_L$ of a target value for controlling the object evaluating value $Z_T$ to V and v in the step 213. In addition, when $|D|<b$ does not hold (in the step 211) and it is determined (in step 214) that the determining value D is +b or more, it is determined that the luminance of the object in the picture is relatively high, to respectively set the upper limit $Z_U$ and the lower limit $Z_L$ to U and u in the step 214. Furthermore, when it is determined (in the step 212) that the determined value D is −b or less, it is determined that the luminance of the object in the picture is relatively low, to respectively set the upper limit $Z_U$ and the lower limit $Z_L$ to W and w in the step 215. It is assumed in advance $U \geq V \geq W$ and $u \geq v \geq w$ respectively hold between the upper limits and between the lower limits. Accordingly, a target range, corresponding to relative brightness in the picture, of the object evaluating value $Z_T$ is set.

Meanwhile, the above described predetermined value b is a limit value taken when the luminance level of the main object is visually recognized to be significantly higher or significantly lower than the luminance level of the entire picture, which is experimentally found in advance.

Then, in the steps 216 and 217, the object evaluating value $Z_T$, the upper limit $Z_U$ and the lower limit $Z_L$ of the target value are compared. If $Z_U > Z_T > Z_L$ holds, it is determined that proper exposure is obtained, to maintain the iris motor 7 for driving the optical stop-down mechanism 6 in the stopped state to maintain the present diaphragm opening. On the other hand, if the object evaluating value $Z_T$ is larger than the upper limit $Z_U$, it is determined that overexposure is made, to drive the iris motor 7 in the direction in which the stop-down mechanism 6 is closed by one step in the step 219. On the other hand, if the object evaluating value $Z_T$ is smaller than the lower limit $Z_L$, it is determined that underexposure is made, to drive the iris motor 7 in the direction in which the stop-down mechanism 6 is opened by one step in the step 218. This iris motor 7 is constituted by a stepping motor.

Thus, exposure most suitable for the main object in the focusing area can be obtained while executing the automatic iris routine over fields.

As described in the foregoing, according to the embodiment of the present invention, even if an object moves outside of a first sampling area in a central portion of a picture after it is brought into focus, an autofocus operation can be performed with respect to a second sampling area larger than the first sampling area. Whenever each of the sampling areas is alternatively selected as a focusing area, a reference value for determination is set based on a focus evaluating value of the object for each area, so that a malfunction of automatic focusing can be prevented.

Furthermore, when a distinct peak does not occur in a focus evaluating value, a sampling area having the larger maximum evaluating value is selected as a focusing area, so that the possibility of erroneous detection of an in-focus position due to noises or the like can be decreased.

Additionally, so long as no abnormal luminance portion exists in an area, a priority area used for exposure control is changed following a focusing area. Thus, even if a main object moves in a picture, exposure to the main object is always maintained at an optimum value.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image sensing apparatus for automatically matching the focus relative to an object, comprising:

image sensing means (2, 8) having a focusing lens and an image sensor for generating a video signal in response to light incident from said object, relative position changing means (3, 4) for changing a relative position in the direction of an optical axis of said focusing lens relative to said image sensor, sampling area setting means (13, 15) for setting a first sampling area located in the center of an image sensed picture and a second sampling area including said first sampling area and having a larger area than that of said first sampling area by time division of said video signal, focus evaluating value detecting means (9, 10, 13, 4, 16, 17) for detecting every constant time period a level of a high frequency component in a video signal in each of said first and second sampling areas to supply the same as a focus evaluating value in the corresponding sampling area, each of the focus evaluating values taking the maximum value in an in-focus position, means (26) for selecting either one of said first and second sampling areas as a focusing area according to a relative relation between the newest value of the focus evaluating value in each of said first and second sampling areas and a variable reference value calculated based on the previous focus evaluating value in the corresponding sampling area, and control means (26, 27) for controlling said relative position changing means based on a focus evaluating value corresponding to the sampling area selected as said focusing area so as to drive the relative position of said focusing lens to a position where the focus evaluating value becomes the maximum value.

2. The image sensing apparatus according to claim 1, wherein said focusing area selecting means comprises means for calculating said variable reference value based on the maximum value of the previous focus evaluating value in said corresponding sampling area.

3. The image sensing apparatus according to claim 2, wherein said focusing area selecting means comprises means for selecting a focusing area depending on which of the difference between the newest focus evaluating value and the maximum value of the previous focus evaluating value in said corresponding sampling area and said variable reference value is larger.

4. The image sensing apparatus according to claim 3, wherein said variable reference value is a value which is one-n-th (n: positive integer) of the maximum value of the previous focus evaluating value in said corresponding sampling area.

5. The image sensing apparatus according to claim 4, wherein said variable reference value is a value which is one-eight of the maximum value of the previous focus evaluating value in said corresponding sampling area.

6. The image sensing apparatus according to claim 3, wherein said focusing area selecting means comprises means for switching focusing areas when the difference between said newest focus evaluating value and the maximum value of the previous focus evaluating value exceeds said variable reference value.

7. The image sensing apparatus according to claim 1, wherein said focus evaluating value detecting means comprises first filter means for extracting a level of a first high frequency component in said video signal, second filter means for extracting a level of a second high frequency component including a component at a frequency which is lower than the frequency of said first high frequency component, means for alternately selecting outputs of said first and second filter means every said constant time period, and means for accumulating every said first and second sampling areas the level of the first or second high frequency component in said video signal extracted by said first or second filter means.

8. The image sensing apparatus according to claim 1, wherein said focusing area selecting means makes selection after the relative position of said focusing lens is driven once to the position where said focus evaluating value becomes the maximum value.

9. An image sensing apparatus for automatically matching the focus relative to an object, comprising:

image sensing means (2, 8) having a focusing lens and an image sensor for generating a video signal in response to light incident from said object, relative position changing means (3, 4) for changing a relative position in the direction of an optical axis of said focusing lens relative to said image sensor, sampling area setting means (13, 15) for setting a first sampling area located in the center of an image sensed picture and a second sampling area including said first sampling area and having a larger area than that of said first sampling area by time division of said video signal, focus evaluating value detecting means (9, 10, 13, 14, 16, 17) for detecting every constant time period a level of a high frequency component in a video signal in each of said first and second sampling areas to supply the same as a focus evaluating value in the corresponding sampling area, each of the focus evaluating values taking the maximum value in an in-focus position, means (26) for selecting either one of said first and second sampling areas as a focusing area, first control means (26) for controlling said relative position changing means based on a focus evaluating value corresponding to the sampling area selected as said focusing area so as to drive the relative position of said focusing lens to a position where the focus evaluating value takes the maximal value having a predetermined projected amount as compared with focus evaluating values in relative positions of focusing lens before and after said position of said focusing lens, and second control means (26) for comparing the respective maximum values of the focus evaluating values in said first and second sampling areas per unit area when the focus evaluating value corresponding to said selected sampling area does not take said maximal value and controlling said relative position changing means so as to fix the relative position of said focusing lens to a position where the focus evaluating value in the sampling area having the larger maximum value reaches a maximum.

10. The image sensing apparatus according to claim 9, wherein said focusing area selecting means comprises means for selecting either one of said first and second sampling areas as a focusing area according to a relative relation between the newest value of said focus evaluating value in each of said first and second sampling areas and a variable reference value calculated based on the previous focus evaluating value in the corresponding sampling area.

11. The image sensing apparatus according to claim 9, wherein said focus evaluating value detecting means comprises first filter means for extracting a level of a first high frequency component in said video signal, second filter means for extracting a level of a second high frequency component including a component at a frequency which is lower than the frequency of said first high frequency component, means for alternately selecting outputs of said first and second filter means every said constant time period, and means for accumulating every said first and second sampling areas the level of the first or second high frequency component in said video signal extracted by said first or second filter means.

12. An image sensing apparatus for automatically matching the focus and the exposure relative to an object, comprising:

image sensing means (2, 8) having a focusing lens and an image sensor for generating a video signal in response to light incident from said object, relative position changing means (3, 4) for changing a relative position in the direction of an optical axis of said focusing lens relative to said image sensor, means (6, 7) for changing exposure relative to said object, means (13, 15) for setting a plurality of sampling areas divided on an image sensed picture by time division of said video signal, focus evaluating value detecting means (9, 10, 13, 14, 16-21) for detecting every constant time period a level of a high frequency component in a video signal in each of said plurality of sampling areas to supply the same as a focus evaluating value in the corresponding sampling area, each of the focus evaluating values taking the maximum value in an in-focus position, exposure evaluating value detecting means (11, 13, 14, 16-21) for detecting every constant time period a level of a luminance signal in the video signal in each of said plurality of sampling areas to supply the same as an exposure evaluating value in the corresponding sampling area, first selecting means (26) for selecting any one of said plurality of sampling areas as a focusing area, first control means (26) for controlling said relative position changing means based on a focus evaluating value corresponding to the sampling area selected as said focusing area so as to drive the relative position of said focusing lens to a position where the focus evaluating value becomes the maximum value, second selecting means (26) for selecting as a priority area for exposure control the sampling area selected by said first selecting means, and second control means (26) for controlling said exposure changing means such that the exposure evaluating value corresponding to the sampling area selected as said priority area coincides with a predetermined target level.

13. The image sensing apparatus according to claim 12, which further comprises means for determining based on the exposure evaluating value in each of said plurality of sampling areas whether or not an abnormal luminance portion exists in the corresponding sampling area, and said second selecting means selects as said priority area the sampling area selected by said first selecting means only when said determining means determines that no abnormal luminance portion exits.

14. The image sensing apparatus according to claim 13, wherein said plurality of sampling areas comprises at least a first sampling area located in the center of the image sensed picture, a second sampling are including said first sampling area and having a larger area than that of said first sampling area and a third sampling area defined by excluding said first sampling area from said second sampling area.

15. The image sensing apparatus according to claim 14, wherein said second selecting means comprises means for selecting said first sampling area as the priority area if no abnormal luminance portion exists in said first sampling area while selecting said second sampling area as the priority area if an abnormal luminance portion exists, when said first sampling area is selected as said focusing area, and means for selecting said second sampling area as the priority area if no abnormal luminance portion exists in said second sampling area while supplying the average value of exposure evaluating values in the remaining sampling areas where no abnormal luminance portion exists to said second control means as an exposure evaluating value in the priority area if an abnormal luminance portion exists, when said second sampling area is selected as said focusing area.

16. The image sensing apparatus according to claim 14, wherein said focusing area selecting means comprises means for selecting either one of said first and second sampling areas as a focusing area according to a relative relation between the newest value of said focus evaluating value in each of said first and second sampling areas and a variable reference value calculated based on the previous focus evaluating value in the corresponding sampling area.

* * * * *

UNITED STATES PATENT AND TRADEMARK OFFICE
CERTIFICATE OF CORRECTION

PATENT NO. : 5,003,339

DATED : Mar. 26, 1991

INVENTOR(S) : Kikuchi et al.

It is certified that error appears in the above-identified patent and that said Letters Patent is hereby corrected as shown below:

Column 30, line 20    Delete "second" and replace by --third--; and
          line 23    Delete "second" and replace by --third--.

Signed and Sealed this

Third Day of August, 1993

Attest:

MICHAEL K. KIRK

Attesting Officer    Acting Commissioner of Patents and Trademarks